US011300809B2

(12) United States Patent
Sugihara

(10) Patent No.: US 11,300,809 B2
(45) Date of Patent: Apr. 12, 2022

(54) OPTICAL STRUCTURE AS MOTIF

(71) Applicant: TOPPAN PRINTING CO., LTD., Tokyo (JP)

(72) Inventor: Keitaro Sugihara, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 229 days.

(21) Appl. No.: 16/586,112

(22) Filed: Sep. 27, 2019

(65) Prior Publication Data
US 2020/0026092 A1 Jan. 23, 2020

Related U.S. Application Data

(63) Continuation of application No. PCT/JP2018/013483, filed on Mar. 29, 2018.

(30) Foreign Application Priority Data

Mar. 29, 2017 (JP) .............................. JP2017-064855

(51) Int. Cl.
*G02B 30/60* (2020.01)
*G02B 5/09* (2006.01)
(Continued)

(52) U.S. Cl.
CPC ............. *G02B 30/35* (2020.01); *B42D 25/36* (2014.10); *G02B 5/0825* (2013.01); *G02B 5/09* (2013.01);
(Continued)

(58) Field of Classification Search
CPC ........ G02B 30/60; G02B 5/0825; G02B 5/09; G02B 17/002; G02B 30/35; G02B 5/0833;
(Continued)

(56) References Cited

U.S. PATENT DOCUMENTS 9,465,148 B2 10/2016 Schilling et al.
2008/0258456 A1* 10/2008 Rahm .................. B42D 25/324
283/85

(Continued)

FOREIGN PATENT DOCUMENTS

DE 10 2005 061 749 A1 7/2007
DE 10 2008 046 128 A1 3/2010
(Continued)

OTHER PUBLICATIONS

International Searching Authority, "International Search Report," issued in connection with International Patent Application No. PCT/JP2018/013483, dated Jun. 26, 2018.
(Continued)

*Primary Examiner* — Jade R Chwasz
(74) *Attorney, Agent, or Firm* — Foley & Lardner LLP

(57) ABSTRACT

An optical structure surface including a plurality of display region groups including a first display region group and a second display region group. In each display region group, an azimuth angle is formed between a projection direction and a reference direction, and a plurality of reflective surfaces belonging to the display region produce an image. A plurality of display regions include a set of display regions whose azimuth angles are different from each other, and the plurality of display regions display an image unique to the display region group in a display direction by a plurality of reflective surfaces of each of the display regions. The display directions of the first display region group and the second display group are different to provide a different brightness to their respective images, in the respective display directions of the images.

12 Claims, 10 Drawing Sheets

(51) Int. Cl.
*G02B 30/35* (2020.01)
*B42D 25/36* (2014.01)
*G02B 5/08* (2006.01)
*G02B 17/00* (2006.01)
*G02B 30/00* (2020.01)
*B42D 25/29* (2014.01)
*B42D 25/373* (2014.01)
*B42D 25/378* (2014.01)
*B42D 25/405* (2014.01)

(52) U.S. Cl.
CPC ............ *G02B 17/002* (2013.01); *G02B 30/00* (2020.01); *G02B 30/60* (2020.01); *B42D 25/29* (2014.10); *B42D 25/373* (2014.10); *B42D 25/378* (2014.10); *B42D 25/405* (2014.10)

(58) Field of Classification Search
CPC ...... B42D 25/36; B42D 25/29; B42D 25/373; B42D 25/378; B42D 25/405; B42D 25/425; B42D 25/324; G09F 19/14
USPC ........................................................ 359/584
See application file for complete search history.

(56) References Cited

U.S. PATENT DOCUMENTS

| | | | |
|---|---|---|---|
| 2012/0319395 A1 | 12/2012 | Fuhse et al. | |
| 2014/0312608 A1* | 10/2014 | De Blas | B42D 25/29 283/85 |
| 2016/0167422 A1* | 6/2016 | Brehm | B42D 25/00 359/567 |
| 2018/0022143 A1 | 1/2018 | Borgsmuller et al. | |
| 2018/0117949 A1 | 5/2018 | Fuhse | |

FOREIGN PATENT DOCUMENTS

| | | | |
|---|---|---|---|
| DE | 10 2015 202 106 A1 | 8/2016 | |
| DE | 10 2015 005 911 A1 | 11/2016 | |
| JP | 2008-547040 A | 12/2008 | |
| JP | 2013-167796 A | 8/2013 | |
| WO | WO-2016177470 A1 * | 11/2016 | B42D 25/00 |

OTHER PUBLICATIONS

International Searching Authority, "Written Opinion," issued in connection with International Patent Application No. PCT/JP2018/013483, dated Jun. 26, 2018.
Extended European Search Report dated Feb. 25, 2020 for corresponding Application No. 18775243.1.

* cited by examiner

OPTICAL STRUCTURE AS MOTIF

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/013483, filed on Mar. 29, 2018, which is based upon and claims the benefit of priority to and to Japanese Patent Application No. 2017-064855, filed on Mar. 29, 2017, the disclosures of which are all incorporated herein by reference in their entireties.

TECHNICAL FIELD

A display unit which displays an image by reflection of light is publicly available. Also, a method of producing a display unit which displays an image by reflection of light is publicly available. Furthermore, high quality printing (Fine Press) provided with the display unit is publicly available.

BACKGROUND ART

An optical structure which displays an image by reflection of light can be applied to high quality printing (Fine Press). This high quality printing may be security printing. Security printing may include printing of authentication documents, valuable securities and banknotes. High quality printing can reduce or prevent forgery thereof (e.g., see PTL 1).

[Citation List] [Patent Literature] PTL 1: JP 2008-547040 A

SUMMARY OF THE INVENTION

Technical Problem

Techniques for analyzing optical structures as mentioned above have been evolved to create structures which are difficult to forge. Also, techniques for producing such optical structures are more and more diversified to embody structures which are difficult to forge. However, development of the techniques for analyzing optical structures leads to facilitating analyses of optical structures for the purpose of forging them. Also, diversification of techniques for producing optical structures leads to facilitating production of forged items. Under the circumstances, new optical structures, or optical structures as high quality motifs in particular, are even more strongly needed than ever before.

To cope with such needs, the present disclosure provides a high quality optical structure that can be used as a motif.

Proposed Improvement or Solution to Problem

An optical structure includes a structure surface that includes a plurality of display region groups including a first display region group and a second display region group, each of the display region groups having a plurality of display regions. In the optical structure, each display region of each display region group includes a plurality of reflective surfaces that reflect light incident on the structure surface toward a display direction of an image that is unique to the display region group. The reflective surfaces are arranged at an average pitch of 1 µm or more and 300 µm or less in a direction in which the reflective surfaces are arranged. In each display region, a projection direction is defined, the projection direction being a direction in which a normal direction to the reflective surfaces is projected onto the structure surface and having an azimuth angle relative to a reference direction in the structure surface, and the plurality of reflective surfaces belonging to the display region produce an image. In each display region group, the plurality of display regions include a set of display regions whose azimuth angles are different from each other, and the plurality of display regions produce an image, which is unique to the display region group, in the display direction by the plurality of reflective surfaces belonging to each of the display regions. The display direction of the first display region group is different from the display direction of the second display group to provide brightness that is different between the image unique to the first display region group and the image unique to the second display region group, in the respective display directions of the images. The first display region group and the second display region group match each other to produce a motif.

DETAILED DESCRIPTION OF REPRESENTATIVE EMBODIMENTS

Figure 1:
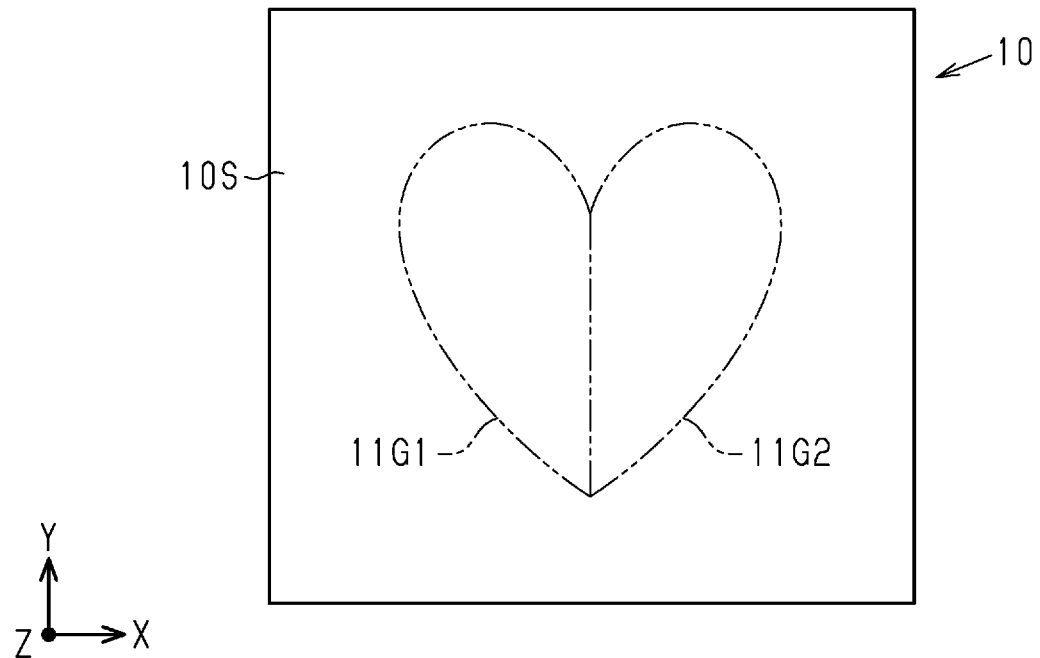
FIG. 1 is a schematic plan view illustrating an optical structure of the present disclosure.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

Optical structures 10 or 40 each form a motif. When producing an image, motifs are used singly, in combination of the same types, in combination of different types, or in combination of the same and different types. When applied to a product, motifs are used singly, in combination of the same types, in combination of different types, or in combination of the same and different types. When forming a complete or an independent portion of a decorative pattern, a mark, a symbol, a logo, a character, a pictorial symbol, an icon, an emblem or a heraldic emblem, motifs are used singly, in combination of the same types, in combination of different types, or in combination of the same and different types. The optical structures 10 or 40 as motifs are used singly, or in combination of the same types, in combination of different types, or in combination of the same and different types, for application to paper or film media having printing thereon to obtain high quality printing (Fine Press). An optical structure can display different images and the images match each other to produce a motif.

First Embodiment of the Present Invention

Referring to FIGS. 1 to 15, a first embodiment of an optical structure as a motif will be described. In the following description, a configuration, an appearance and a production method of the optical structure will be sequentially explained. The first embodiment is a mode of the present disclosure and can be implemented in combination with a second embodiment described later. By combining the first embodiment with the second embodiment described later, functions of both of the embodiments can be exerted. Combination of the first embodiment and the second embodiment described later can create synergetic effects.

[Configuration of the Optical Structure]

Referring to FIGS. 1 to 7, a configuration of an optical structure will be described.

FIG. 1 shows an optical structure 10 having a structure surface 10S which includes a first display region group 11G1 and a second display region group 11G2. Each display region group produces an image unique thereto in one observation direction. In other words, each display region group displays an image unique thereto in a display direction. An image produced by the first display region group 11G1 is a first image, and an image produced by the second display region group 11G2 is a second image.

In the optical structure 10, the structure surface 10S serves as a surface for the first and second display region groups 11G1 and 11G2 to display images unique to the respective groups. The structure surface 10S includes two display region groups. However, the structure surface 10S may include three or more display region groups, and images unique to the respective groups may be displayed on the structure surface 10S. The structure surface 10S may be flat or curved.

In plan view perpendicular to the structure surface 10S, the structure surface 10S has one direction that is the X direction and another direction that is the Y direction perpendicular to the X direction. The direction perpendicular to the X-Y plane that is defined by the X and Y directions is the Z direction.

In plan view perpendicular to the structure surface 10S, a shape of a heart is formed by the first and second display region groups 11G1 and 11G2. The first and second display region groups 11G1 and 11G2 are adjacent to each other in the X direction. The first display region group 11G1 has a shape of one half of the heart shape obtained by cutting it perpendicularly to the X direction, and the second display region group 11G2 has a shape of the other half of the heart shape. The first and second images each produce an image that is a part of one complete shape. The first and second images match each other to produce a motif.

The two display region groups may each display one entire shape, or the two groups do not have to display any shape at all. For instance, the two groups may each display one entire shape, with the first display region group 11G1 displaying the shape using polygonal faces, and with the second display region group 11G2 displaying the shape using wire frame shapes. Alternatively, for instance, the second display region group 11G2 may be included in the first display region group 11G1, with the first display region group 11G1 alone displaying one entire shape, and with the second display region group 11G2 not contributing to the shape.

The display region groups may have individual shapes. The display region groups may each have a shape of an entire or an independent portion of a decorative pattern, a mark, a symbol, a logo, a character, a pictorial symbol, an icon, an emblem or a heraldic emblem. In plan view perpendicular to the structure surface 10S, the display region groups respectively have contours which are equal to those of the images produced by the respective display region groups.

Figure 2:
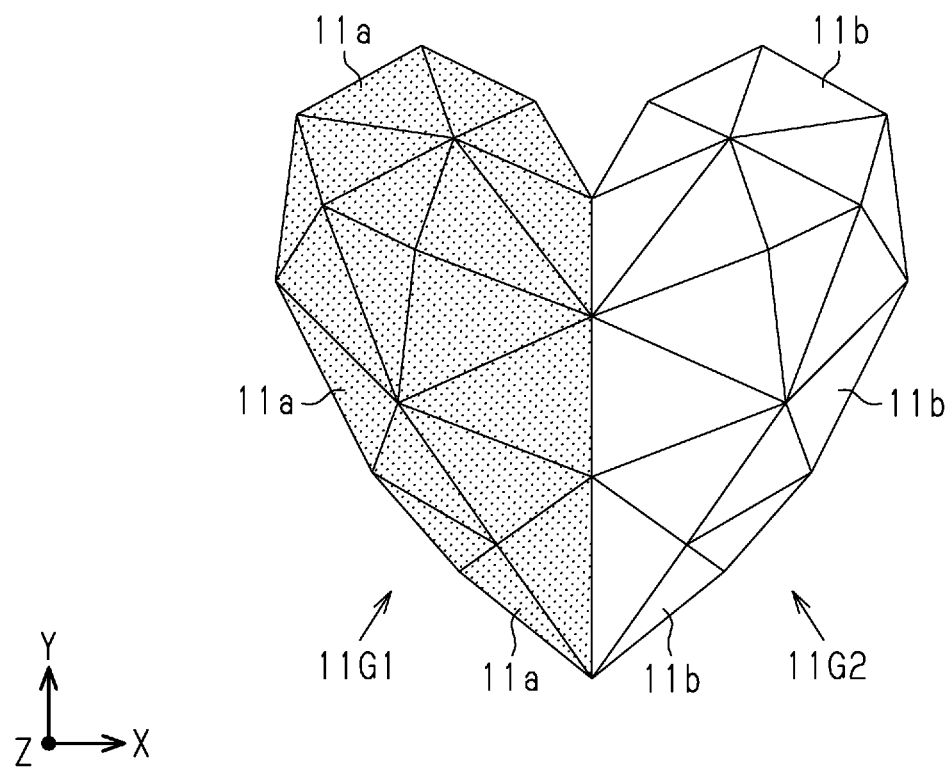
FIG. 2 is a schematic partially enlarged plan view illustrating a structure of a display region group.

FIG. 2 is an enlarged plan view illustrating the structures of the first and second display region groups 11G1 and 11G2. In FIG. 2, display regions of the first display region group 11G1 are dotted to easily distinguish them from the display regions of the second display region group 11G2.

As shown in FIG. 2, the first display region group 11G1 is configured by a plurality of first display regions 11a, while the second display region group 11G2 is configured by a plurality of second display regions 11b. In plan view perpendicular to the structure surface 10S, the first display regions 11a are disposed in a region on the structure surface 10S so as not to overlap with the region in which the second display regions 11b are disposed. In other words, on the structure surface 10S, the region defined by the contour of the first display region group 11G1 does not overlap with the region defined by the contour of the second display region group 11G2. However, as will be described in the second embodiment, there may be a part where these regions overlap with each other.

In plan view perpendicular to the structure surface 10S, the display regions each have a polygonal shape. As shown in FIG. 2, the display regions each have a triangular shape in the present embodiment. Besides a triangular shape, the display regions may each have a square or pentagonal shape. In each display region group, the display regions may have two or more different polygonal shapes.

The plurality of display regions configuring each display region group include several types that are different from each other at least in shape or size. It should be noted that the expression "different from each other in shape" refers to similar polygons having side lengths or angles that are different among the polygons. In each display region group, the adjacently located display regions are in contact with each other. Specifically, in each display region group, two adjacently located display regions share one side defining these regions.

The optical structure 10 produces a vector image with the first display regions 11a and the second display regions 11b, that is, an assembly of regions expressed by vectors.

Each display region has an area or a size which is visually recognizable to the naked eye of the observer of the optical structure 10. Each display region, when having an area of 0.1 mm2 or more and 0.5 mm2 or less, is visually recognizable to the naked eye. Each display region group may include display regions with different areas.

Referring to FIGS. 3 to 7, the structure of each display region will be described more specifically. Although the region where the first display regions 11a are provided on the structure surface 10S is different from the region where the second display regions 11b are provided thereon, the structure of each reflective surface is common between the former region and the latter region. Accordingly, the following description will be focused on the first display regions 11a, omitting description for the second display regions 11b.

Figure 3:
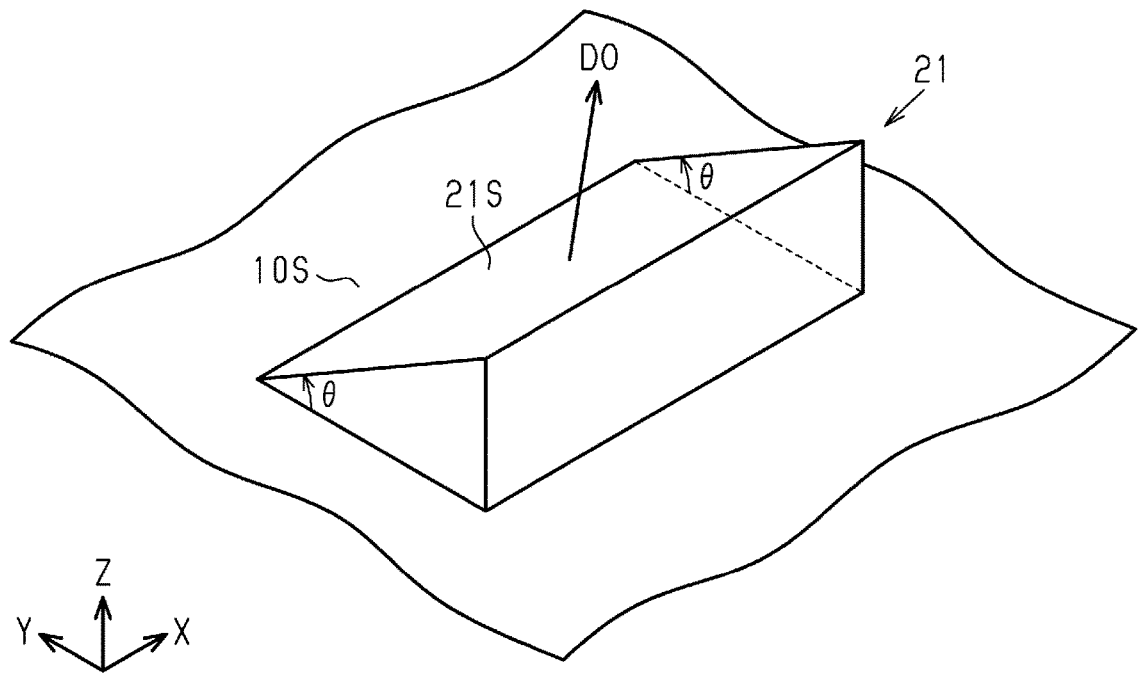
FIG. 3 is a schematic perspective view illustrating a structure of a scale mirror provided to a display region.

As shown in FIG. 3, each of the reflective surfaces 21S provided to each first display region 11a corresponds to a face of a scale mirror 21. In the X-Y plane where the structure surface 10S expands, the scale mirror 21 extends in one direction. It should be noted that FIG. 3 shows an example of a scale mirror 21 extending in the X direction.

The reflective surface 21S is an optical surface extending parallel to a plane intersecting the structure surface 10S. The angle formed between the reflective surface 21S and the structure surface 10S is an inclination angle θ which is constant in the direction in which the scale mirror 21 is elongated. Each reflective surface 21S is a mirror surface which causes mirror reflection of visible light, and specularly reflects light incident on the reflective surface 21S in a direction conforming to the inclination angle θ.

The angle between the direction normal to the reflective surface 21S and the travel direction of light entering the reflective surface 21S is an incidence angle of light. Light is not incident on each reflective surface 21S from one direction but from directions over a particular range. This is because light incident on each reflective surface 21S emerges from a light source having some size. Accordingly, light is incident on a point of the reflective surface 21S from directions over a particular range that depends on the size of and the distance to the light source. Thus, the incidence angle has a particular range. Each reflective surface 21S reflects light incident thereon. When the optical structure is observed under normal conditions, the observation direction DO is also within a particular range. Specifically, since an observation point under normal observation conditions is within a particular range, the observation direction DO defined by the particular range and the distance to the reflective surface from the observation point has a particular range. The respective reflective surfaces 21S in each display region group have shapes where the specific observation direction DO, i.e., a direction common to the plurality of reflective surfaces 21S, includes the reflection direction, i.e. emerging direction, of light that is incident on the reflective surfaces 21S over the particular range and emerges therefrom.

The scale mirror 21 may be a projection on the structure surface 10S having a triangular prism shape, or may be a recess in the structure surface 10S having a reflective surface 21S.

The reflective surface 21S of each scale mirror 21 may be an optical interference coating surface. The optical interference coating is configured by one or more dielectric layers. When the optical interference coating is configured by a plurality of dielectric layers, reflected light with a given wavelength will be intensified due to differences in refractive index between the boundaries of the plurality of dielectric layers contacting each other in the direction in which they are overlapped, and reflected light with a wavelength other than that will be cancelled due to the differences. Thus, the optical structure 10 can produce an image which has colors conforming to the wavelengths of light reflected by the multiple interference layers.

The plurality of dielectric layers may have a configuration in which a plurality of laminates, each including one high refractive index layer and one low refractive index layer, are overlapped with each other. The material for forming the high refractive index layer may be tantalum oxide, and the material for forming the low refractive index layer may be silicon oxide.

Figure 4:
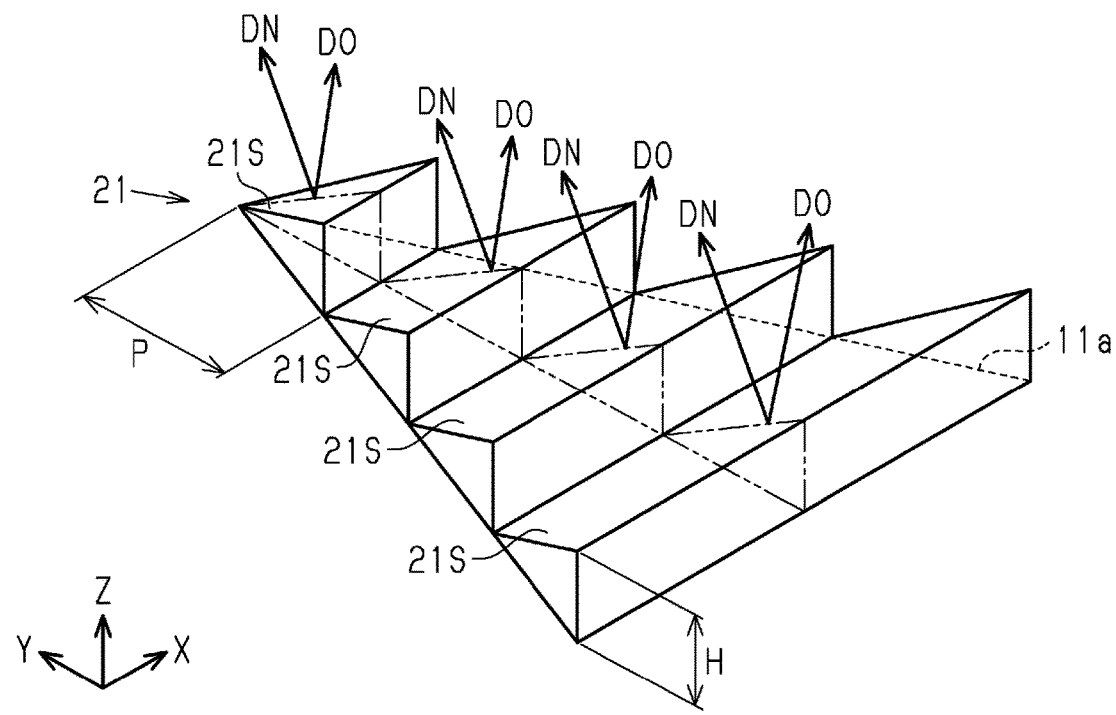
FIG. 4 is a schematic perspective view illustrating a structure of a plurality of scale mirrors provided to a display region.

As shown in FIG. 4, each first display region 11a includes a plurality of reflective surfaces 21S. Each reflective surface 21S reflects light, which is incident on the structure surface 10S, into an angular range including the observation direction DO of which there is one per display region group. In other words, each first display region 11a includes a plurality of reflective surfaces 21S each of which reflects light incident on the structure surface 10S toward a direction within a predetermined angular range including the observation direction DO. The plurality of reflective surfaces 21S are arranged at a given pitch P in a direction in which they are arranged. The pitch P in this case is 1 μm or more and 300 μm or less. FIG. 4 shows, as an example, a plurality of reflective surfaces 21S provided to one first display region 11a and arranged in the Y direction.

Since the pitch P is 1 μm or more in this configuration, the plurality of reflective surfaces 21S do not produce diffracted light that is in the wavelength range of visible light. Therefore, the image displayed by the optical structure 10 is produced by light emerging from the individual reflective surfaces 21S, i.e., produced by white light which is based on specular reflection mentioned above. Also, since the pitch P is 300 μm or less, which is smaller than the resolution of the human eye, the reflective surfaces 21S of each first display region 11a are unlikely to be visually recognized by the observer of the optical structure 10.

Furthermore, since a plurality of reflective surfaces 21S are arranged at the given pitch P, the effects, as mentioned above, due to the pitch P being 1 μm or more and 300 μm or less can be obtained from all over the first display region 11a, compared to the configuration having various pitches P. Thus, the first image displayed by the first display region group 11G1 is easily visually recognized as an assembly of image segments produced by the respective first display regions 11a.

In each first display region 11a, the reflective surfaces 21S have one normal direction DN. As described above, each reflective surface 21S reflects light in the observation direction DO. In each first display region 11a, the normal direction DN of each reflective surface 21S is equal to the normal directions of other reflective surfaces 21S. As seen perpendicularly to the first display region 11a, the normal direction DN of each reflective surface 21S is the direction in which the reflective surface 21S is oriented.

The first display region group 11G1 includes first display regions 11a whose normal directions DN of the reflective surfaces 21S are different from each other. Specifically, the first display region group 11G1 includes a plurality of directions as the normal directions DN of the reflective surfaces 21S. In other words, among the plurality of first display regions 11a, some have normal directions DN of the reflective surface 21S which are different from those of others.

As described above, in plan view perpendicular to the structure surface 10S, each display region 11a has a triangular shape and is enclosed by three other first display regions 11a. Each triangular display region 11a shares its respective sides with the three display regions 11a and is defined by them. The normal direction DN of the reflective surfaces 21S of each first display region 11a may be different from those of the reflective surfaces 21S of the first display regions 11a that it shares sides with. Among one first display region 11a and three first display regions 11a that have shared sides, at least two first display regions 11a may have the same normal directions DN of the reflective surfaces 21S. Specifically, among one first display region 11a and a plurality of first display regions 11a enclosing this first display region 11a, the normal directions DN of the reflective surfaces 21S may be different from each other. Thus, the image produced by the optical structure 10 can be easily recognized as a three-dimensional image.

Each first display region 11a has a normal direction DN of the reflective surfaces 21S and the normal direction DN may be located on the inside of the group of normal directions DN of the reflective surfaces 21S of the first display regions 11a enclosing this first display region 11a. Specifically, a normal direction DN can be expressed by a sum of a group of normal directions DN. When a normal direction DN is expressed by a sum of a group of normal directions DN, the coefficient has a positive value. Thus, the optical structure 10 can display a more natural three-dimensional image. The optical structure 10 does not have to include the first display regions 11a all satisfying the requirements described above, but may include only several first display regions 11a satisfying the requirements.

In each scale mirror 21, the distance between the reflective surface 21S and the structure surface 10S, i.e., between the reflective surface 21S and the first display region 11a included in the structure surface 10S, has a maximum height H. In each first display region 11a, the reflective surfaces 21S have a constant height H. In other words, the height H of each reflective surface 21S is equal to those of other reflective surfaces 21S. Since the heights H of all the reflective surfaces 21S are equal to each other in each first display region 11a, the plurality of reflective surfaces 21S of the first display region 11a can be easily formed, compared to the configuration in which the reflective surfaces 21S have several different heights H. Furthermore, according to the structure where all the reflective surfaces 21S have heights H equal to each other, the reflective surfaces 21S can be formed with high accuracy in shape in the production process.

In the first display region group 11G1, the ratio of the minimum height H to the maximum height H of the reflective surfaces 21S is 50% or more. In other words, for the first display region group 11G1, the ratio of the minimum height H to the maximum height H is 50% or more. Thus, difference in intensity of light reflected from the plurality of reflective surfaces 21S for producing an image is prevented from becoming excessively large among the reflective surfaces 21S. Therefore, the image produced by the first display region group 11G1 is prevented from not being recognized as one image.

Figure 5:
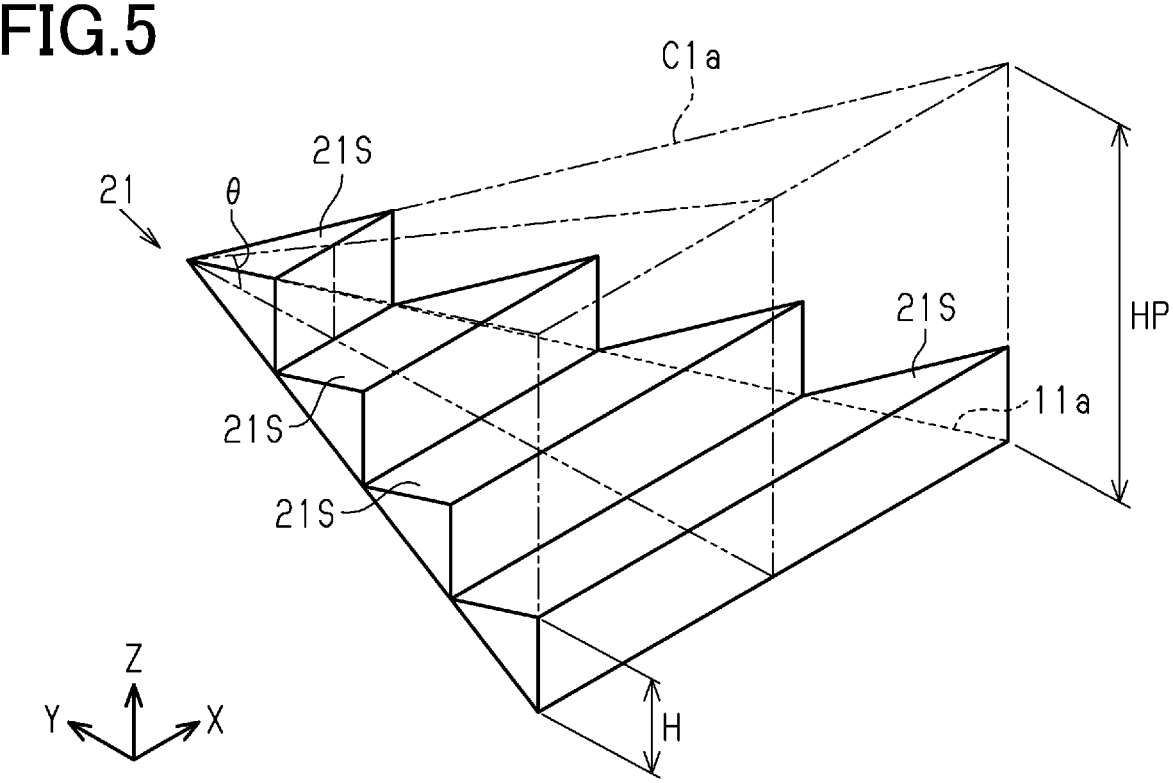
FIG. 5 is a perspective view illustrating functions of a plurality of reflective surfaces in each display region.

As shown in FIGS. 4 and 5, in each first display region 11a, the reflective surfaces 21S have one normal direction DN. Thus, the plurality of reflective surfaces 21S belonging to each first display region 11a reflect light in the observation direction DO to produce one first image segment C1a.

The plurality of reflective surfaces 21S can produce one first image segment C1a in each first display region 11a. The first image segment C1a has a shape in which the plurality of reflective surfaces 21S are combined in a direction in which they are arranged. Specifically, in plan view perpendicular to the structure surface 10S, the first image segment C1a has an area that is equal to the sum of areas of the plurality of reflective surfaces 21S. The inclination angle θ of the first image segment C1a relative to the first display region 11a that is the structure surface 10S in other words is equal to the inclination angle θ of each reflective surface 21S relative to the structure surface 10S. The maximum distance between the first image segment C1a and the structure surface 10S corresponds to a height HP of the first image segment C1a. The height HP is equal to a value obtained by multiplying the height H of the reflective surface 21S by the number of reflective surfaces 21S.

Thus, the first display region 11a can produce one first image segment C1a with light emerging from the plurality of reflective surfaces 21S belonging to this first display region 11a. One first image segment C1a corresponds to an image which emerges from one phantom plane covering one entire first display region 11a and forming a predetermined angle relative to the first display region 11a.

As described above, the reflective surfaces 21S are arranged at a pitch of 1 μm or more and thus no diffracted light emerges from the reflective surfaces 21S. Accordingly, light emerging from the plurality of reflective surfaces 21S easily produces one first image segment C1a. Furthermore, since the reflective surfaces 21S are arranged at a pitch of 300 μm or less, the reflective surfaces 21S are unlikely to be visually recognized by the observer. Thus, the observer can easily visually recognize the first image segment C1a. FIGS. 4 and 5 each show, as an example, a first display region 11a provided with four scale mirrors 21. However, the number of the scale mirrors 21, i.e., the number of the reflective surfaces 21S, of one first display region 11a may be three or less, or may be five or more. Among the plurality of first display regions 11a configuring the first display region group 11G1, some may include different numbers of reflective surfaces 21S than others.

Figure 6:
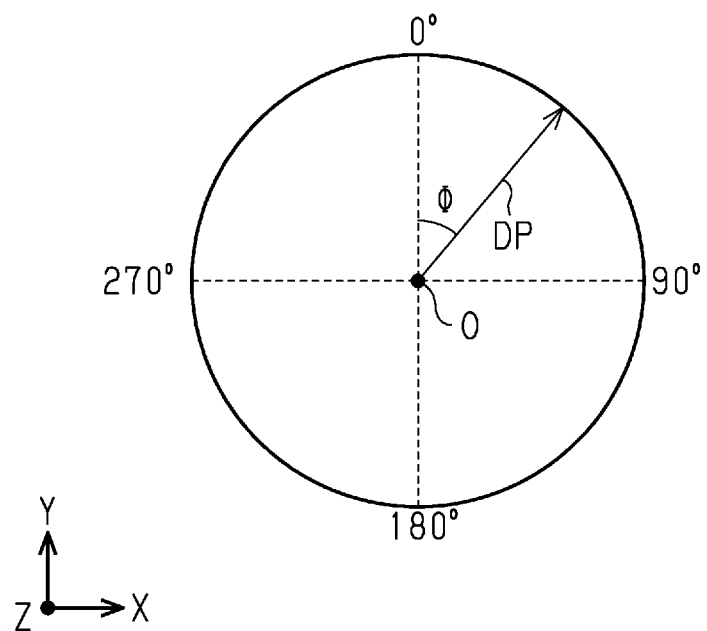
FIG. 6 is a plan view illustrating an azimuth angle in each reflective surface.

FIG. 6 shows a projection direction DP that is a direction (unit vector) in which the normal direction DN (normal vector) of the reflective surfaces 21S is projected onto the structure surface 10S of the optical structure 10. The angle of the projection direction DP relative to a reference direction in the structure surface 10S is an azimuth angle Φ of the reflective surfaces 21S. In the present embodiment, the reference direction is the Y direction. Similar to the normal direction DN, one azimuth angle Φ is provided to each first display region 11a. Thus, the plurality of reflective surfaces 21S belonging to each first display region 11a are configured to produce one first image segment C1a. In other words, the plurality of reflective surfaces 21S belonging to each first display region 11a are configured to produce one first image segment C1a.

The first display region group 11G1 includes first display regions 11a whose azimuth angles Φ of the reflective surfaces 21S are different from each other. In other words, the plurality of first display regions 11a include a set of first display regions 11a in which the azimuth angles Φ are different from each other. When the number of first display regions 11a included in the first display region group 11G1 is n, the number of first display regions 11a included in a set is 2 or more and n or less. The first display region group 11G1 is configured to produce an image unique thereto in the observation direction DO, based on the first image segments C1a to be produced by the respective first display regions 11a.

When the optical structure 10 is observed from the observation direction DO of the first display region group 11G1, an image displayed by the first display region group 11G1 is visually recognized. When the optical structure 10 is observed from the observation direction DO of the second display region group 11G2, an image displayed by the second display region group 11G2 is visually recognized. Moreover, these images are each configured by the image segments produced by light that has emerged from a phantom plane covering one entire display region, while the image segments are each produced by light having an intensity conforming to the azimuth angle Φ of the reflective surfaces 21S forming the image segment. Thus, in the optical structure 10, the first and second display region groups 11G1 and 11G2 produce respective three-dimensional images each based on the difference in brightness among the image segments, and these images are produced in respective observation directions DO different from each other. Consequently, the optical structure 10 will have a high-quality appearance. In this way, the optical structure 10 as a motif will have high quality. Moreover, the optical structure 10 will be impressive to the observer.

In the reflective surfaces 21S, the azimuth angle Φ is 0° or more and less than 360°. In the present embodiment, when the projection direction DP of the reflective surfaces 21S is parallel to the Y direction, i.e., when the projection direction DP is directed upward as viewed in the figure, the azimuth angle Φ of the reflective surfaces 21S is 0°. The point where the direction having an azimuth angle Φ of 0° intersects the direction having an azimuth angle Φ of 90° is the origin O.

The optical structure 10 is configured such that the observation direction DO of the first display region group 11G1 is different from that of the second display region group 11G2 by respectively using the azimuth angles Φ of the reflective surfaces 21S of the first display regions 11a and the azimuth angles Φ of the reflective surfaces 21S of the second display regions 11b. Thus, the optical structure 10 is configured such that the images unique to the first and second display region groups 11G1 and 11G2, respectively, are different from each other in brightness, when the eyepoint is at a predetermined position relative to the structure surface 10S, i.e., when the structure surface 10S is observed from a predetermined direction. The reflective surfaces 21S of the first display regions 11a correspond to the first reflective surfaces, while the reflective surfaces 21S of the second display regions 11b correspond to the second reflective surfaces.

Since the range of azimuth angles Φ of the first reflective surfaces is different from that of the second reflective surfaces, light reflected from the first reflective surfaces and light reflected from the second reflective surfaces are unlikely to be simultaneously visually recognized by an observer OB. Specifically, the image produced by the first reflective surfaces and the image produced by the second reflective surfaces are unlikely to be simultaneously visually recognized by the observer. Accordingly, a first image PIC1 produced by the first display region group 11G1 and a second image PIC2 produced by the second display region group 11G2 are easily visually recognized independently.

The azimuth angles Φ of the first reflective surfaces are in a first range Φ1, while the azimuth angles of the second reflective surfaces are in a second range 12 which is different from the first range Φ1. For example, the first range Φ1 is a predetermined range that is 0° or more and less than 180°, and the second range 12 is a predetermined range that is 180° or more and less than 360°.

Relative to a plane which is perpendicular to the structure surface 10S and extends along the projection direction DP whose azimuth angle Φ is 90° or 270°, the optical structure 10 is tilted such that the portion of the structure surface 10S intersecting the plane and the portion of the plane intersecting the structure surface 10S both remain unchanged. Thus, according to the above configuration, tilting of the optical structure 10 allows the image displayed by the optical structure 10 to change between the first image produced by the first display region group 11G1 and the second image produced by the second display region group 11G2.

Figure 7:
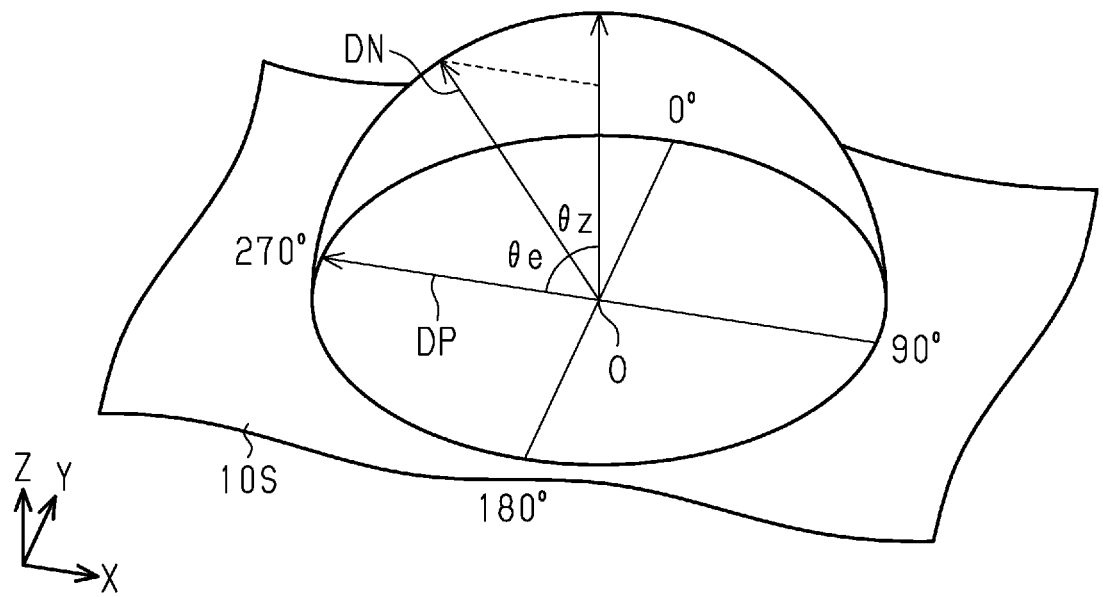
FIG. 7 is a perspective view illustrating an elevation angle in each reflective surface.

FIG. 7 shows a hemisphere protruding in the Z direction from the structure surface 10S. In the hemisphere, the angle formed between the normal direction DN of the reflective surfaces 21S and the projection direction DP that is a projection of the normal direction DN onto the structure surface 10S is an elevation angle θe that is an angle formed if one looks upward from the origin O along the normal direction DN in the structure surface 10S. In other words, the angle formed between the normal direction DN of the reflective surfaces 21S and the Z direction is a zenith angle θz.

A state in which the optical structure 10 is disposed parallel to the X-Y plane is referred to as a reference state. In the optical structure 10, the projection direction DP of each reflective surface 21S in the reference state is referred to as a reference projection direction. When the observer of the optical structure 10 tilts the optical structure 10, the observer will tilt the optical structure 10 such that the normal direction DN and the reference projection direction of each reflective surface 21S change in the range of about 0° to about 180°.

The observer may tilt the optical structure 10 longitudinally, or the observer may tilt it laterally. The expression "tilt the optical structure 10 longitudinally" refers to the optical structure 10 being tilted in the Y direction such that the angle formed between the normal direction DN and the reference projection direction in each reflective surface 21S changes. In other words, the expression refers to the optical structure 10 being tilted such that the portion of the X-Z plane intersecting the optical structure 10 and the portion of the optical structure 10 intersecting the X-Z plane both remain unchanged. The expression "tilt the optical structure 10 laterally" refers to the optical structure 10 being tilted in the X direction such that the angle formed between the normal direction DN and the reference projection direction in each reflective surface 21S changes. In other words, the expression refers to the optical structure 10 being tilted such that the portion in the Y-Z plane intersecting the optical structure 10 and the portion in the optical structure 10 intersecting the Y-Z plane both remain unchanged.

Usually, each first display region 11a includes vertical surfaces, inclined surfaces, flat surfaces or scattering surfaces, in addition to the plurality of reflective surfaces 21S. Of these surfaces, the vertical surfaces or the inclined surfaces connect the reflective surfaces 21S to the structure surface 10S, and are included in the respective scale mirrors 21. The flat surfaces or the scattering surfaces are placed in regions where the reflective surfaces 21S are not placed, in plan view perpendicular to the structure surface 10S. When the surfaces connecting between the respective reflective surfaces 21S to the structure surface 10S are vertical surfaces, the area of the reflective surfaces 21S can be maximized in each first display region 11a. When each first display region 11a is configured to include inclined surfaces or flat surfaces, the area of the reflective surfaces 21S can be modulated by changing the angle of the inclined surfaces or changing the area of the flat surfaces.

When each first display region 11a includes scattering surfaces, the area of the reflective surfaces 21S can be modulated, and scattering light can be permitted to emerge in directions different from the reflective surfaces 21S. By modulating the area of the reflective surfaces 21S of the first display regions 11a, the quantities of light reflected from the respective first display regions 11a may be made different from each other.

The optical structure 10 may include first display regions 11a provided with vertical surfaces, and first display regions 11a provided with inclined surfaces or flat surfaces or scattering surfaces. Thus, the area of the reflective surfaces 21S may be made different among the first display regions 11a, owing to which the quantity of reflected light may be made different among the first display regions 11a, resultantly achieving much richer expression.

[Appearance of the Optical Structure as a Motif]

Figure 8:
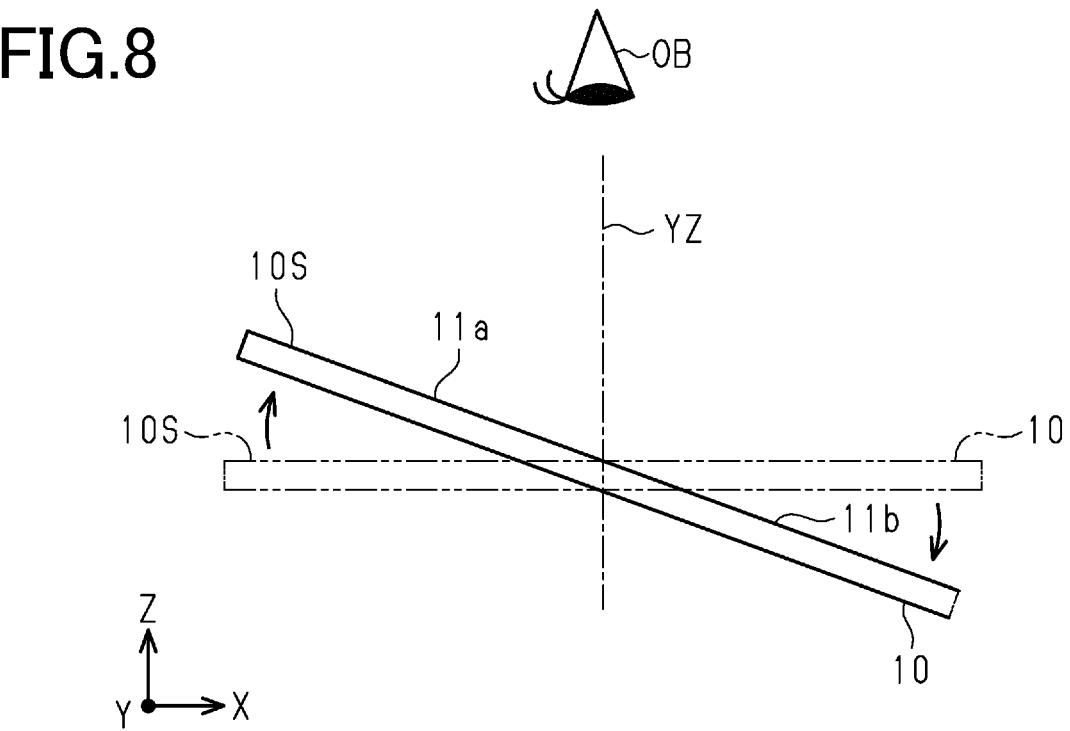
FIG. 8 is a schematic end elevational view illustrating a state in which an optical structure is tilted relative to the Y-Z plane.
Figure 9:
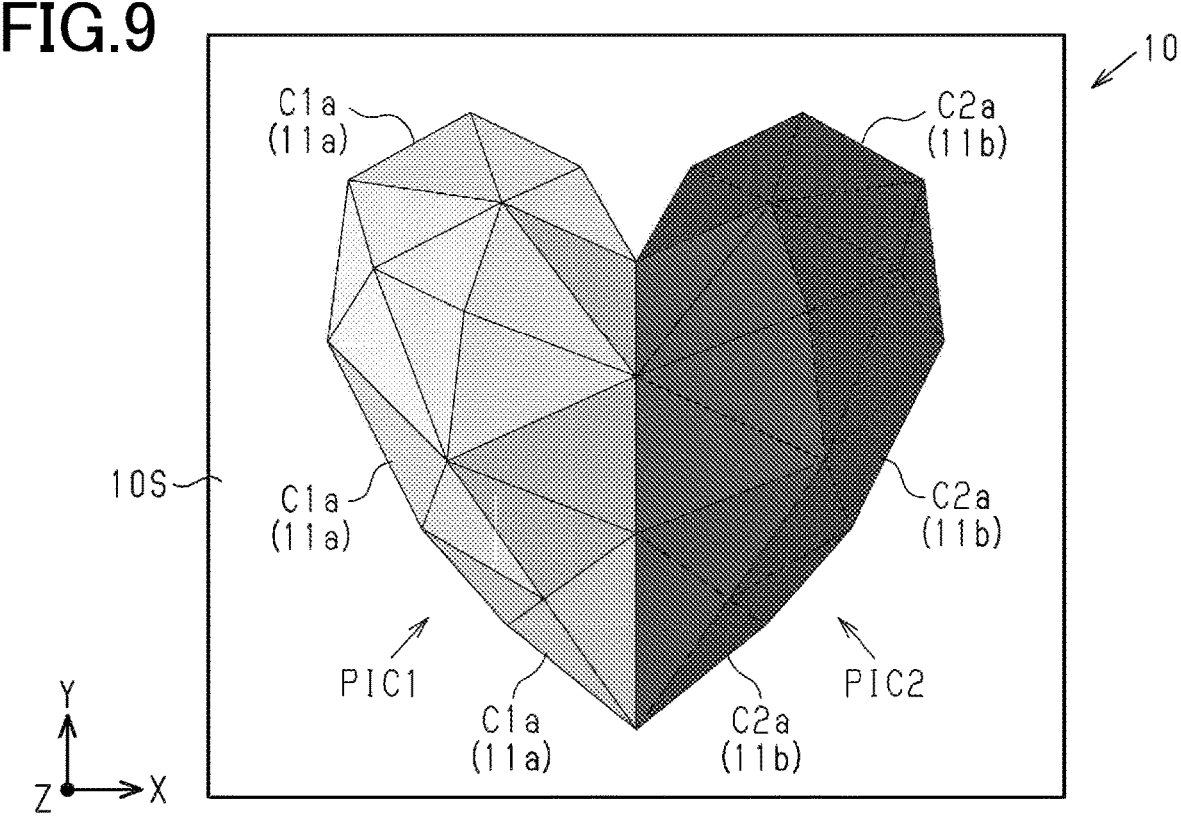
FIG. 9 is a plan view illustrating light and dark in display regions provided to an optical structure.
Figure 12:
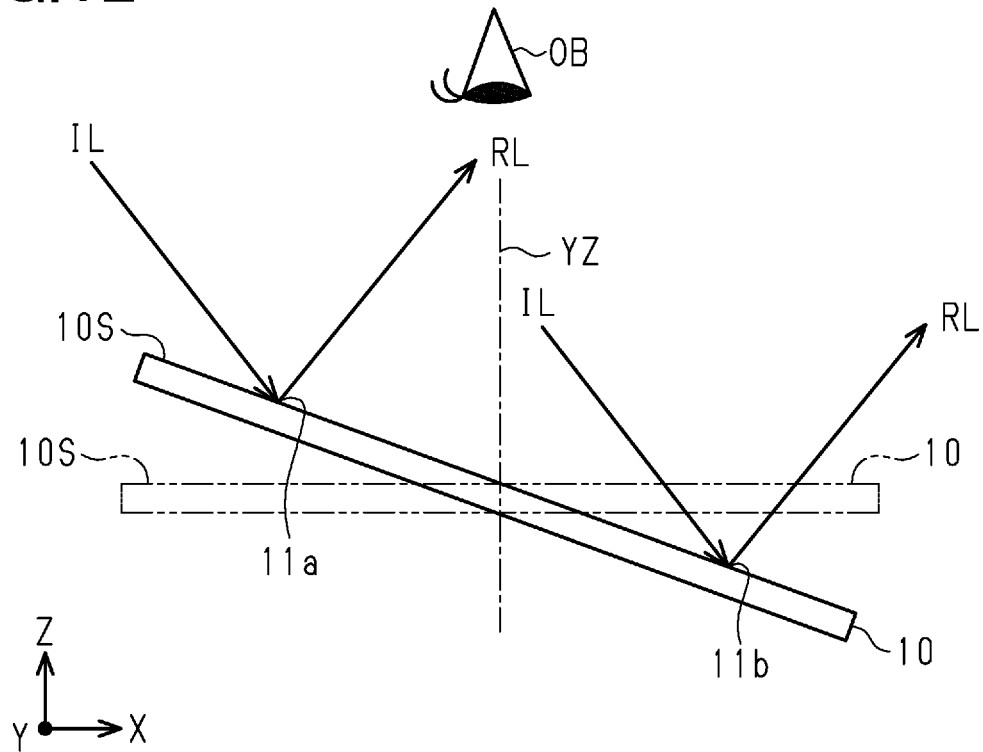
FIG. 12 is a schematic end elevational view illustrating light emerging from an optical structure.
Figure 13:
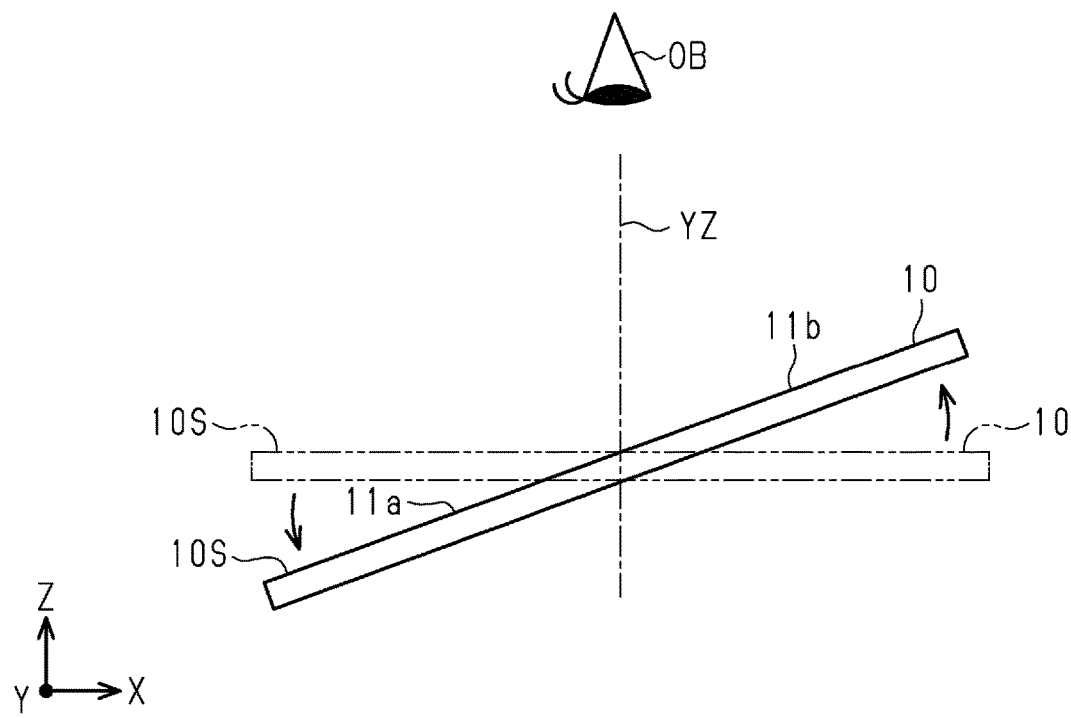
FIG. 13 is a schematic end elevational view illustrating a state in which an optical structure is tilted relative to the Y-Z plane.
Figure 14:
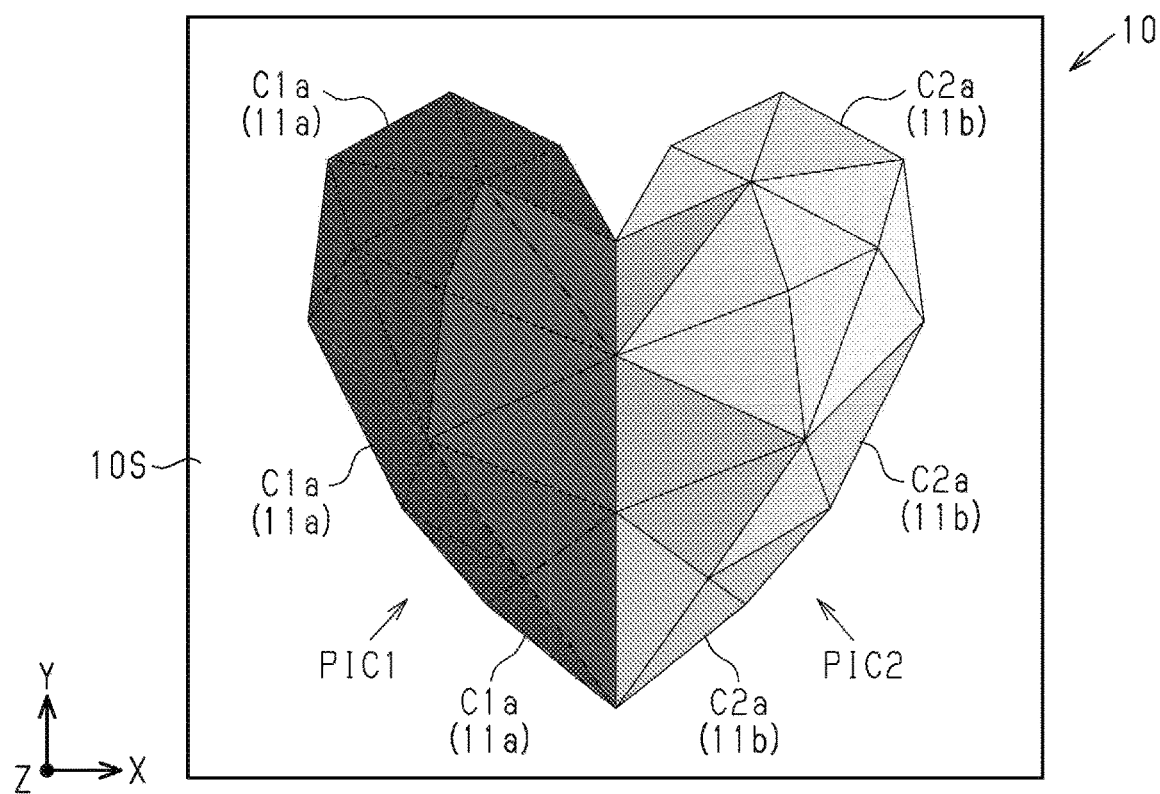
FIG. 14 is a plan view illustrating light and dark in display regions provided to an optical structure.

Referring to FIGS. 8 to 15, the appearance of the optical structure as a motif will be described. FIGS. 9 and 14 each show brightness, or light and dark in other words, in images respectively formed by the display region groups, by gradation of colors imparted to the respective groups. In FIGS. 9 and 14, color gradations are imparted such that portions of the images having lower brightness are given darker color.

As shown in FIG. 8, the observer OB is observing the optical structure 10 in the reference state, i.e., the optical structure 10 disposed parallel to the X-Y plane, from a direction of the observer's line of sight which is included in the Y-Z plane and is normal to the X-Y plane. The observer OB laterally tilts the optical structure 10 without changing the position and direction of observing the optical structure 10. In this case, the observer OB tilts the optical structure 10 rightward. In other words, the observer OB tilts the optical structure 10 so as to be lowered more in the 90° direction of the azimuth angle $\Phi$ than in the 270° direction of the azimuth angle 1, with reference to the Z direction. More specifically, the observer OB tilts the optical structure 10 such that the region in the structure surface 10S including the first display regions 11a comes closer to the observer OB than does the region including the second display regions 11b.

Thus, as shown in FIG. 9, the observer OB can visually recognize the first image PIC1 produced by the first display region group 11G1. The first image PIC1 is configured by the first image segments C1a respectively produced by the plurality of first display regions 11a. Therefore, the first image PIC1 produced by the first display region group 11G1 is visually recognized by the observer as a three-dimensional image due to difference in brightness among the first image segments C1a configuring the first image PIC1.

In this case, the total quantity of light in the first image segments C1a configuring the first image PIC1 is larger than the total quantity of light in the second image segments C2a configuring the second image PIC2. In other words, each first image segment C1a has brightness that is higher than the brightness of any one of the second image segments C2a.

In contrast, the second image segments C2a of the second image PIC2 have substantially the same brightness. Thus, the second image PIC2 is visually recognized as a planar image having a uniform appearance.

Figure 10:
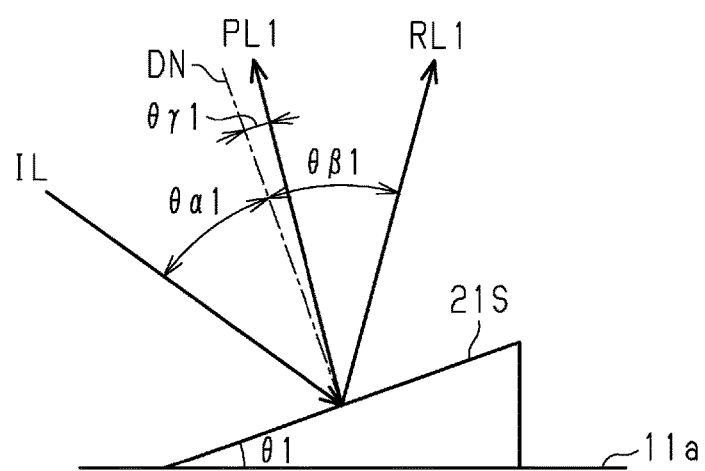
FIG. 10 is an end elevational view illustrating a relationship between an incidence angle and an emerging angle in an example of a reflective surface.
Figure 11:
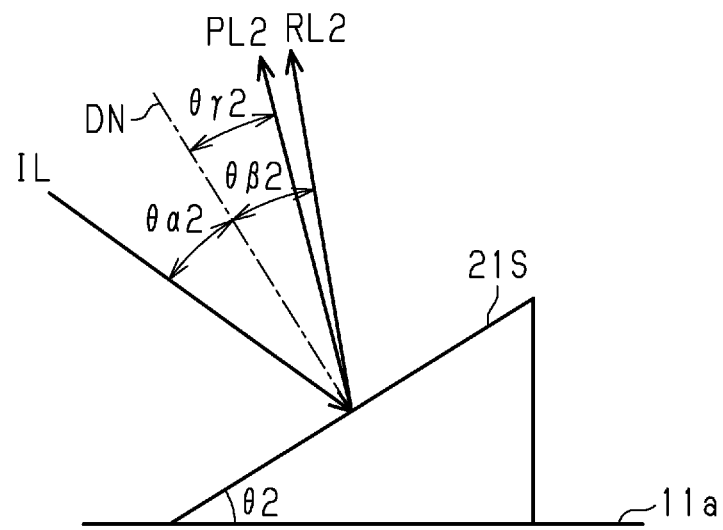
FIG. 11 is an end elevational view illustrating a relationship between an incidence angle and an emerging angle in an example of a reflective surface.

Referring to FIGS. 10 to 12, a more specific description will be given of a relationship between the normal direction DN of the reflective surfaces 21S and quantity of light per unit area emerging from each reflective surface 21S. This specific description will explain the reason why the first image PIC1 is visually recognized as a three-dimensional image, while the second image PIC2 is visually recognized as a planar image. The following description will be given by way of an example the reflective surfaces 21S provided to each first display region 11a. The same applies to the reflective surfaces 21S provided to each second display region 11b.

FIG. 10 shows an example of a reflective surface 21S of a first display region 11a. As shown in the figure, the reflective surface 21S has an inclination angle $\theta$, i.e., a first inclination angle $\theta 1$, relative to the first display region 11a. FIG. 11 shows an example of a reflective surface 21S of another first display region 11a. As shown in the figure, the reflective surface 21S has an inclination angle $\theta$, i.e., a second inclination angle $\theta 2$, relative to the first display region 11a. The second inclination angle $\theta 2$ is larger than the first inclination angle $\theta 1$.

As shown in FIG. 10, incident light IL which arrives from a predetermined direction is incident on the reflective surface 21S whose inclination angle $\theta$ is the first inclination angle $\theta 1$. At the reflective surface 21S, the angle formed between the direction of incidence of the incident light IL and the normal direction DN is an incidence angle of the incident light IL, and the angle formed between the light emerging from the reflective surface 21S and the normal direction DN is an emerging angle.

The incidence angle of the incident light IL at the reflective surface 21S is a first incidence angle $\theta\alpha 1$, and the emerging angle of first specular reflected light RL1 in the reflective surface 21S is a first emerging angle $\theta\beta 1$. The first incidence angle $\theta\alpha 1$ is equal to the first emerging angle $\theta\beta 1$. Of the reflected light of the reflective surface 21S, the light reflected in the observation direction DO is a first light component PL1 having an emerging angle that is a first emerging angle $\theta\gamma 1$.

As shown in FIG. 11, the incident light IL is incident on the reflective surface 21S, whose inclination angle $\theta$ is the second inclination angle $\theta 2$, at a second incidence angle $\theta\alpha 2$ which is smaller than the first incidence angle θα1. The reflective surface 21S reflects second specular reflected light RL2 at an emerging angle θβ2. Since the second incidence angle θα1 is equal to the second emerging angle θβ2, the second emerging angle θβ2 is smaller than the first emerging angle θβ1. Of the reflected light of the reflective surface 21S, the light emerging in the observation direction DO is a second light component PL2 having an emerging angle that is a second emerging angle θγ2.

Of the light components emerging in a predetermined direction from the reflective surface 21S, the quantity of light of the light components per unit area increases as the difference between the emerging angle of the light components and the emerging angle of specular reflected light decreases. Comparing the reflective surface 21S having the first inclination angle θ1 with the reflective surface 21S having the second inclination angle θ2, the difference between the first emerging angles θβP and θγ1 is larger than the difference between the second emerging angles θβ2 and θγ2. Therefore, quantity of light of the first light components PL1 per unit area is smaller than that of the second light components PL2 per unit area.

Moreover, as shown in FIG. 12, when the optical structure 10 is tilted rightward relative to the reference state, most of the incident light IL that is incident on the first display regions 11a emerges as reflected light RL from the structure surface 10S in the observation direction DO of the observer OB. In contrast, most of the incident light IL that is incident on the second display regions 11b emerges as reflected light RL in a direction different from the observation direction DO of the observer OB.

Thus, the first image PIC1 formed of the plurality of first image segments C1a is produced as a three-dimensional image due to the inclination angles θ and the azimuth angles Φ of the reflective surfaces 21S of the display regions. In contrast, the second image PIC2 formed of the plurality of image segments C2a is visually recognized as a planar image having a uniform appearance.

Since the first display regions 11a each have a triangular shape, first image segments C1a each have a triangular shape. By combining the triangular first image segments C1a, the first image PIC1 to be displayed by the optical structure 10 can be produced. In this way, the image formed on the optical structure 10 is easily recognized as an image expressing a curved surface of a three-dimensional object.

As shown in FIG. 13, the observer OB is observing the optical structure 10 of the reference state from a direction of the observer's line of sight which is included in the Y-Z plane and is normal to the X-Y plane. The observer OB tilts the optical structure 10 leftward without changing the position and direction of observation of the optical structure 10. In other words, the observer OB tilts the optical structure 10 so as to be lowered more in the 270° direction of the azimuth angle Φ than in the 90° direction of the azimuth angle Φ, with reference to the Z direction. More specifically, the observer OB tilts the optical structure 10 such that the region of the structure surface 10S including the second display regions 11b comes closer to the observer OB than does the region including the first display regions 11a.

Thus, as shown in FIG. 14, the observer OB can visually recognize the second image PIC2 produced by the second display region group 11G2. The second image PIC2 is configured by the second image segments C2a respectively produced by the plurality of second display regions 11b. Therefore, the second image PIC2 produced by the second display region group 11G2 is visually recognized by the observer as a three-dimensional image due to difference in intensity of light among the second image segments C2a configuring the second image PIC2.

In this case, the brightness in the second image segments C2a configuring the second image PIC2 is higher than the brightness in the first image segments C1a configuring the first image PIC1. In other words, each second image segment C2a has brightness that is higher than the brightness of any one of the first image segments C1a.

In contrast, brightness is substantially uniform in the first image segments C1a of the first image PIC1. Accordingly, the first image PIC1 is visually recognized as a planar image having a uniform appearance.

Figure 15:
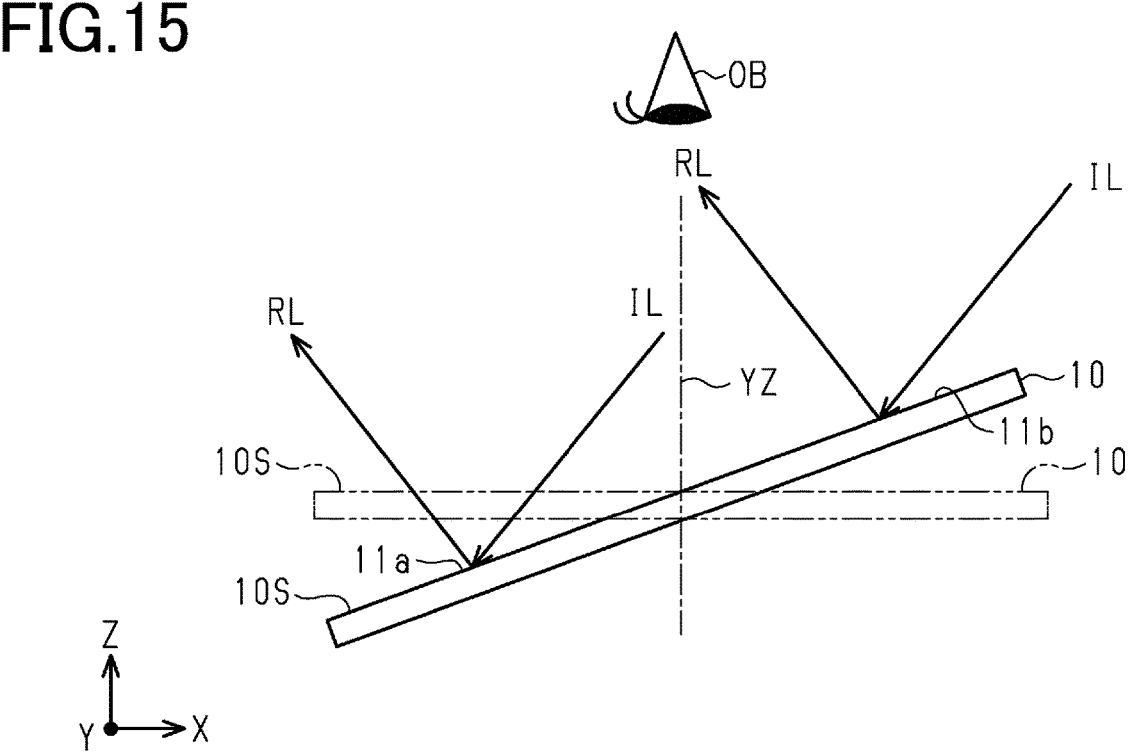
FIG. 15 is a schematic end elevational view illustrating light emerging from an optical structure.

As shown in FIG. 15, when the optical structure 10 is tilted leftward relative to the reference state, most of the incident light IL that is incident on the second display regions 11b emerges as reflected light RL from the structure surface 10S in the observation direction DO of the observer OB. In contrast, most of the incident light IL that is incident on the first display regions 11a emerges as reflected light RL in a direction different from the observation direction DO of the observer OB.

Thus, similarly to when the optical structure 10 is tilted rightward, the second image PIC2 formed of the plurality of second image segments C2a is produced as a three-dimensional image due to the inclination angles θ and the azimuth angles Φ of the reflective surfaces 21S of the display regions. In contrast, the first image PIC1 formed of the plurality of first image segments C1a is visually observed as a planar image having a uniform appearance.

Since the second display region 11b each have a triangular shape, second image segments C2a each have a triangular shape. By combining the triangular second image segments C2a, the second image PIC2 to be displayed by the optical structure 10 can be produced. In this way, the image formed on the optical structure 10 is easily recognized as an image expressing a curved surface of a three-dimensional object.

The difference in light intensity between the first and second images PIC1 and PIC2 when the optical structure 10 is laterally tilted relative to the reference state can be made larger by setting the first and second ranges Φ1 and Φ2 as follows. With this setting, one image is visually recognized as a three-dimensional image and the other image is visually recognized as a planar image. Specifically, the difference between the maximum value in the first range Φ1 and the minimum value in the second range Φ2 may be set to 90° or more, and the difference between the maximum value in the second range Φ2 and the minimum value in the first range Φ1 may be set to 90° or more. Thus, for example, the first range Φ1 may be 45° or more and 135° or less, and the second range Φ2 may be 225° or more and 315° or less. Alternatively, for example, the first range Φ1 may be 30° or more and 45° or less, and the second range Φ2 may be 210° or more and 225° or less.

[Method of Producing the Optical Structure]

The optical structure 10 described above can be produced through a method, for example, including a step of forming an uneven structure layer and a step of forming a reflective layer on a surface of the uneven structure layer. In the step of forming an uneven structure layer, for instance, the uneven structure layer is replicated from a mold.

The original plate is obtained by applying a photosensitive resist onto a surface of a plate-like substrate, and then radiating a beam onto the photosensitive resist for partial exposure thereof, followed by developing the photosensitive resist. Then, the original plate is electroformed to produce a metal stamp which is used as a matrix for forming an uneven structure layer. A metal stamper may also be produced by cutting a metal substrate by using a lathe technique.

The uneven structure layer may be formed, for example, by thermal embossing, casting or photopolymerization. When photopolymerization is used, a radiation curable resin is castbetween a flat film carrier and a metal stamper. Then, the radiation curable resin is cured by applying radiation, and then the cured resin layer is released from the metal stamper together with the carrier. Compared to pressing or casting using a thermoplastic resin, photopolymerization achieves higher structural precision on the scale mirrors 21 and easily provides scale mirrors 21 having higher thermal resistance and chemical resistance.

For instance, various resins may be used as a material for forming the uneven structure layer. The material for forming the uneven structure layer may further contain at least one of a curing agent, a plasticizer, a disperser, various leveling agents, a UV absorber, an antioxidant, a viscosity modifier, a lubricant, a colorant, a light stabilizer, and the like.

The resin may be a UV curable resin, a thermoplastic resin or a thermosetting resin. The UV curable resin may be a monomer, an oligomer or a polymer having an ethylenically unsaturated bond or an ethylenically unsaturated group. The monomer having an ethylenically unsaturated bond or an ethylenically unsaturated group may be 1,6-hexanediol, neopentyl glycol diacrylate, trimethylolpropane triacrylate, pentaerythritol triacrylate, pentaerythritol tetraacrylate, dipentaerythritol pentaacrylate or dipentaerythritol hexaacrylate. The oligomer having an ethylenically unsaturated bond or an ethylenically unsaturated group may be an epoxy acrylate, urethane acrylate or polyester acrylate. The polymer having an ethylenically unsaturated bond or an ethylenically unsaturated group may be a urethane-modified acrylic resin or an epoxy-modified acrylic resin.

The UV curable resin may be an acrylic resin, an acrylic acrylate resin, an epoxy acrylate resin, a urethane acrylate resin, a polyester acrylate resin or an ethylene methacrylate resin.

The thermoplastic resin may be an acrylic resin, an epoxy resin, a cellulose resin or vinyl resin. The thermosetting resin may be a urethane resin, a melamine resin, an epoxy resin or a phenol resin.

The colorant may be a pigment or a dye. The pigment may be an inorganic pigment or an organic pigment. The pigment may also be a fluorescent pigment, a pearl pigment or a magnetic pigment. The dye may be a natural dye or a synthetic dye. The dye may also be a fluorescent dye. The resin materials for forming the uneven structure layer may be used singly or in combination of two or more.

The reflective layer may be formed by deposition. The deposition used for forming the reflective layer may be physical vapor deposition including vacuum deposition, sputtering, ion plating and ionized cluster beam deposition, or chemical vapor deposition including plasma chemical vapor deposition, thermochemical vapor deposition and photochemical vapor deposition.

Of these methods, vacuum deposition or ion plating has higher productivity than other methods and can easily form a reflective layer having good quality. When using physical or chemical vapor deposition, the processing conditions may be determined depending on the material for forming the reflective layer.

The material for forming the reflective layer may be metal or silicon, singly used, or an alloy or a compound. Of the metal or silicon, the metal may be aluminum, gold, silver, platinum, nickel, tin, chromium, titanium or zirconium. The reflective layer may be a multilayer optical interference coating in which the above materials are alternately deposited. The material for forming the multilayer optical interference coating may be zinc oxide or zinc sulfide. If either aluminum or silver is used as a material for forming the reflective layer, high reflectance is easily achieved in a visible light region.

As described above, according to the first embodiment of the optical structure, advantageous effects as set forth below can be achieved.

(1) When the optical structure 10 is observed from the observation direction DO of the first display region group 11G1, a first image PIC1 displayed by the first display region group 11G1 is visually recognized. When the optical structure 10 is observed from the observation direction DO of the second display region group 11G2, a second image PIC2 displayed by the second display region group 11G2 is visually recognized. Moreover, these images are each configured by the image segments produced by light that has emerged from a phantom plane covering one entire display region, while the image segments are each produced by light having an intensity conforming to the azimuth angle $\Phi$ of the reflective surfaces 21S forming the image segment. Thus, in the optical structure 10, the first and second display region groups 11G1 and 11G2 produce respective three-dimensional images each based on the difference in brightness among the image segments, and these images are produced in respective observation directions DO different from each other. This enhances high quality in the appearance of the optical structure 10 as a motif. In this way, high quality is imparted to the optical structure 10 as a motif. Moreover, the optical structure 10 is impressive to the observer.

(2) Since the first and second azimuth angle ranges $\Phi 1$ and $\Phi 2$ are different from each other, light reflected from the first reflective surfaces and light reflected from the second reflective surfaces are unlikely to be simultaneously visually recognized by the observer OB. Specifically, the image produced by the first reflective surfaces and the image produced by the second reflective surfaces are unlikely to be simultaneously visually recognized by the observer OB. Accordingly, the first image PIC1 produced by the first display region group 11G1 and the second image PIC2 produced by the second display region group 11G2 are easily visually recognized independently.

(3) Relative to a plane which is perpendicular to the structure surface 10S and extends along the projection direction DP whose azimuth angle $\Phi$ is 90° or 270°, the optical structure 10 is tilted such that the portion of the structure surface 10S intersecting the plane and the portion of the plane intersecting the structure surface 10S both remain unchanged. Thus, tilting of the optical structure 10 allows the image displayed by the optical structure 10 to change between the first image PIC1 produced by the first display region group 11G1 and the second image PIC2 produced by the second display region group 11G2.

(4) According to the configuration in which the heights H of the reflective surfaces 21S are equal to each other in each display region, the plurality of reflective surfaces 21S can be easily formed, compared to the configuration in which the reflective surfaces 21H have several different heights H.

(5) If the ratio of the minimum height H to the maximum height H of the reflective surfaces 21S is 50% or more in each display region group, difference in intensity of light reflected from the plurality of reflective surfaces 21S for producing an image is unlikely to be excessively large among the reflective surfaces 21S. Therefore, the image produced by a display region group is prevented from not being recognized as a single image.

(6) The wavelength of light emerging from the reflective surfaces 21S may be according to the interference in the multilayer interference layer.

The first embodiment described above may be appropriately modified as follows.

In each display region group, the ratio of the minimum height H to the maximum height H of the reflective surfaces 21S may be less than 50%. With this configuration as well, advantageous effects as in item (1) may be achieved, as long as the observation direction DO of the first display region group 11G1 is configured to be different from the observation direction DO of the second display region group 11G2.

The height H of each reflective surface 21S in each display region does not have to be equal to those of other reflective surfaces 21S therein. With this configuration as well, advantageous effects as in item (1) may be achieved, as long as the observation direction DO of the first display region group 11G1 is configured to be different from the observation direction DO of the second display region group 11G2.

In the reflective surfaces 21S of the optical structure 10, the first range Φ1 may be a predetermined range included in 90° or more and less than 270°, and the second range Φ2 may be a predetermined range included in a range of 0° or more and less than 90° and a range of 270° or more and less than 360°. With this configuration, the image visually recognized by the observer OB can be changed from the first image PIC1 displayed by the first display region group 11G1 to the second image PIC2 displayed by the second display region group 11G2, when the optical structure 10 in the reference state is tilted as set forth below.

Specifically, relative to a plane which is perpendicular to the structure surface 10S and extends along the projection direction DP whose azimuth angle Φ is 0° or 180°, the optical structure 10 may be tilted such that the portion of the structure surface 10S intersecting the plane and the portion of the plane intersecting the structure surface 10S both remain unchanged.

According to this configuration, advantageous effects as set forth below can be achieved.

(7) Relative to a plane which is perpendicular to the structure surface 10S and extends along the projection direction DP whose azimuth angle Φ is 0° or 180°, the optical structure 10 is tilted such that the portion of the structure surface 10S intersecting the plane and the portion of the plane intersecting the structure surface 10S both remain unchanged. Thus, according to the above configuration, tilting of the optical structure 10 allows the image displayed by the optical structure 10 to change between the first image PIC1 produced by the first display region group 11G1 and the second image PIC2 produced by the second display region group 11G2.

The pitch P of arranging the reflective surfaces S21 does not have to be constant in the direction in which the reflective surfaces 21S are arranged, but the average of pitches P of arranging the reflective surfaces 21S may be in the range of 1 µm or more and 300 µm or less. With this configuration, a minimum pitch P and a maximum pitch P may both be in the range of 1 µm or more and 300 µm or less. Furthermore, the most frequent pitch P may be in the range of 1 µm or more and 300 µm or less.

When the average of pitches P of arranging the reflective surfaces 21S is 1 µm or more and 300 µm or less, the above advantageous effects due to the pitch P being 1 µm or more and the above advantageous effects due to the pitch P being 300 µm or less can be achieved in each display region. Therefore, advantageous effects as in item (1) set forth above can be achieved.

Each scale mirror 21 may have two reflective surfaces instead of one.

Figure 16:
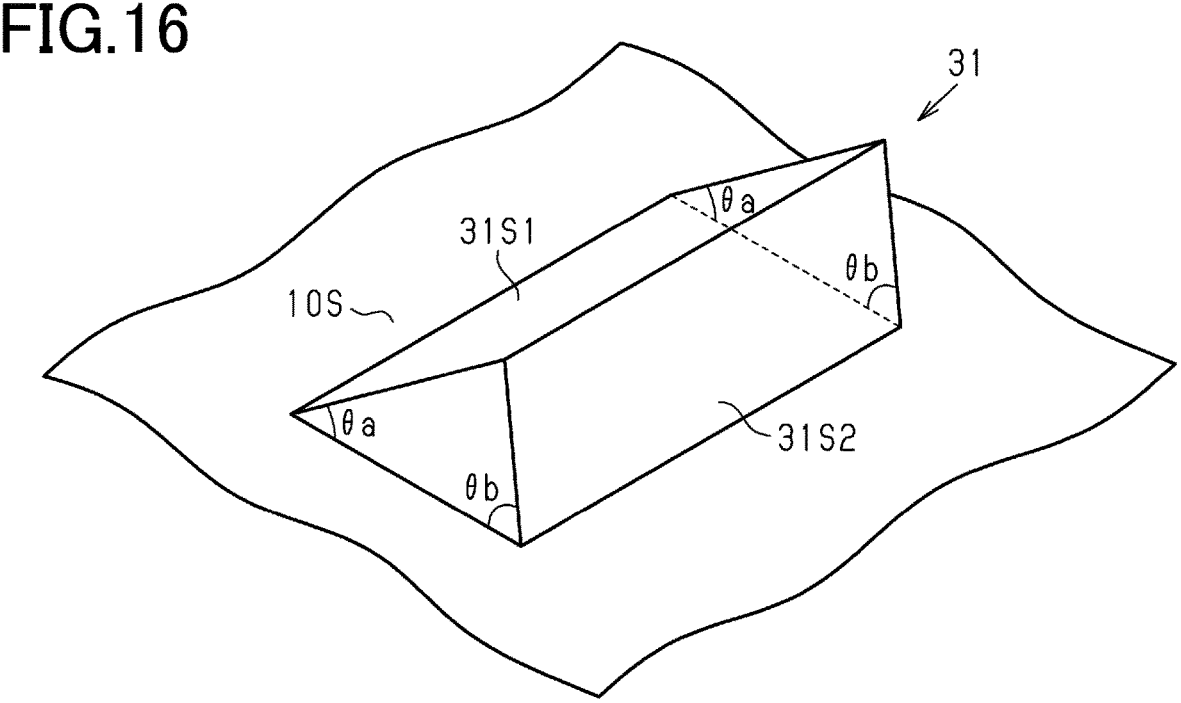
FIG. 16 is a schematic perspective view illustrating a structure of a scale mirror of the present disclosure.

For instance, as shown in FIG. 16, a scale mirror 31 may be provided with a first reflective surface 31S1 and a second reflective surface 31S2. The first and second reflective surfaces 31S1 and 31S2 share one side defining these reflective surfaces. The first reflective surface 31S1 has a first inclination angle θa relative to the structure surface 10S, while the second reflective surface 31S2 has a second inclination angle θb relative to the structure surface 10S. In the example shown in FIG. 16, the first inclination angle θa is smaller than the second inclination angle θb; however the former may be larger than or equal to the latter.

With this configuration as well, one image segment may be produced per display region provided with a plurality of scale mirrors 31, either by the plurality of unidirectionally oriented first reflective surfaces 31S1, or the plurality of unidirectionally oriented second reflective surfaces 31S2. Thus, advantageous effects as in item (1) set forth above can be achieved.

Besides the polygonal shapes mentioned above, the first display regions 11a and the second display region 11b may each have a shape defined by a curved line or a shape defined by curved lines and straight lines. The shape defined by a curved line may be a circular shape, an elliptic shape, or the like. The shape defined by curved lines and straight lines may be a semi-circular shape, a semi-elliptic shape, or the like. The plurality of first display regions 11a or the plurality of second display regions 11b may include at least either display regions each defined by a curved line or display regions each defined by curved lines and straight lines, in addition to the display regions each having a polygonal shape. Alternatively, the plurality of first display regions 11a or the plurality of second display regions 11b may be configured by both of display regions each defined by a curved line and display regions each defined by curved lines and straight lines. With this configuration as well, advantageous effects as in item (1) may be achieved, as long as the observation direction DO of the first display region group 11G1 is configured to be different from the observation direction DO of the second display region group 11G2.

The inclination angle θ may be varied in the direction in which the reflective surface 21S extends, instead of being constant in the extending direction.

For example, each reflective surface 21S may have a base end portion in the direction in which the reflective surface 21S extends and a tip end portion that is the other end portion. The base end portion of the reflective surface 21S has an inclination angle θ that is a base end inclination angle, and the tip end portion has an inclination angle that is a tip end inclination angle. The base end inclination angle may be larger than the tip end inclination angle, so that the inclination angle θ of the reflective surface 21S monotonically decreases from the base end portion toward the tip end portion. Alternatively, the base end inclination angle may be smaller than the tip end inclination angle, so that the inclination angle θ of the reflective surface 21S monotonically increases from the base end portion toward the tip end portion.

The structure surface 10S may be provided with a plurality of pixels, and each display region may be one pixel. For example, the plurality of pixels may be arranged in a matrix pattern on the structure surface 10S. Specifically, the image displayed by the optical structure 10 is not limited to a vector image, but may be a raster image expressed by repetition of pixels as a unit area. With this configuration, the structure of each display region can be designed based on a raster image.

Second Embodiment of the Present Invention

Referring to FIGS. 17 to 20, a second embodiment of an optical structure will be described. The second embodiment is different from the first embodiment in the location of the display regions for displaying the first image and the location of the display regions for displaying the second image. The following description explains the differences in detail and omits detailed explanation for components common to the first embodiment. In the following description, a configuration and an appearance of the optical structure will be sequentially explained. The second embodiment is a mode of the present disclosure and can be implemented in combination with the first embodiment described above. By combining the second embodiment with the first embodiment described above, functions of both the embodiments can be exerted. Combination of the second embodiment with the first embodiment described above can provide synergetic effects.

[Configuration of the Optical Structure]

Figure 17:
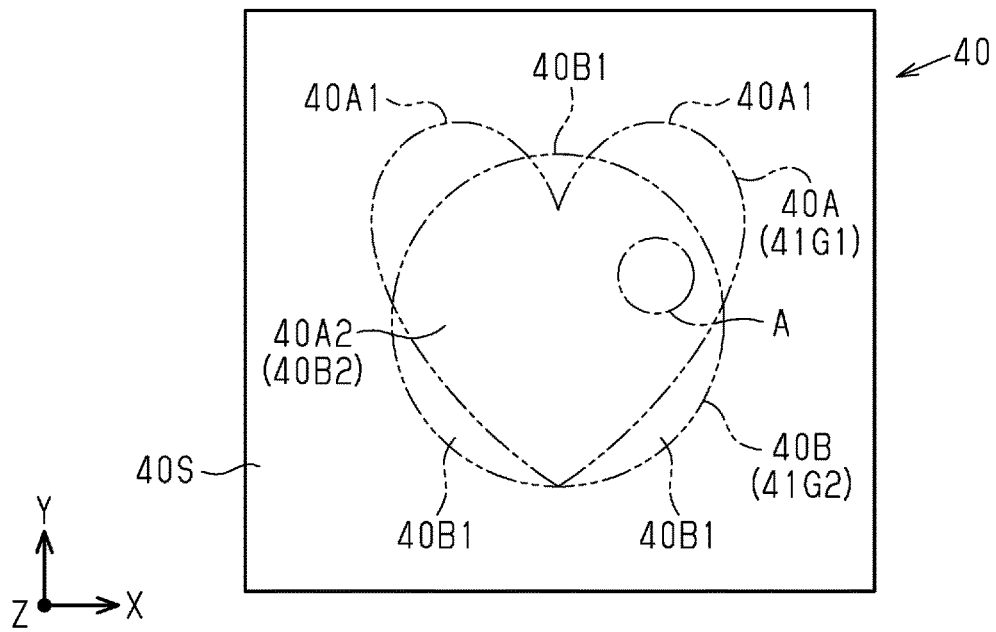
FIG. 17 is a schematic plan view illustrating an optical structure of the present disclosure.
Figure 18:
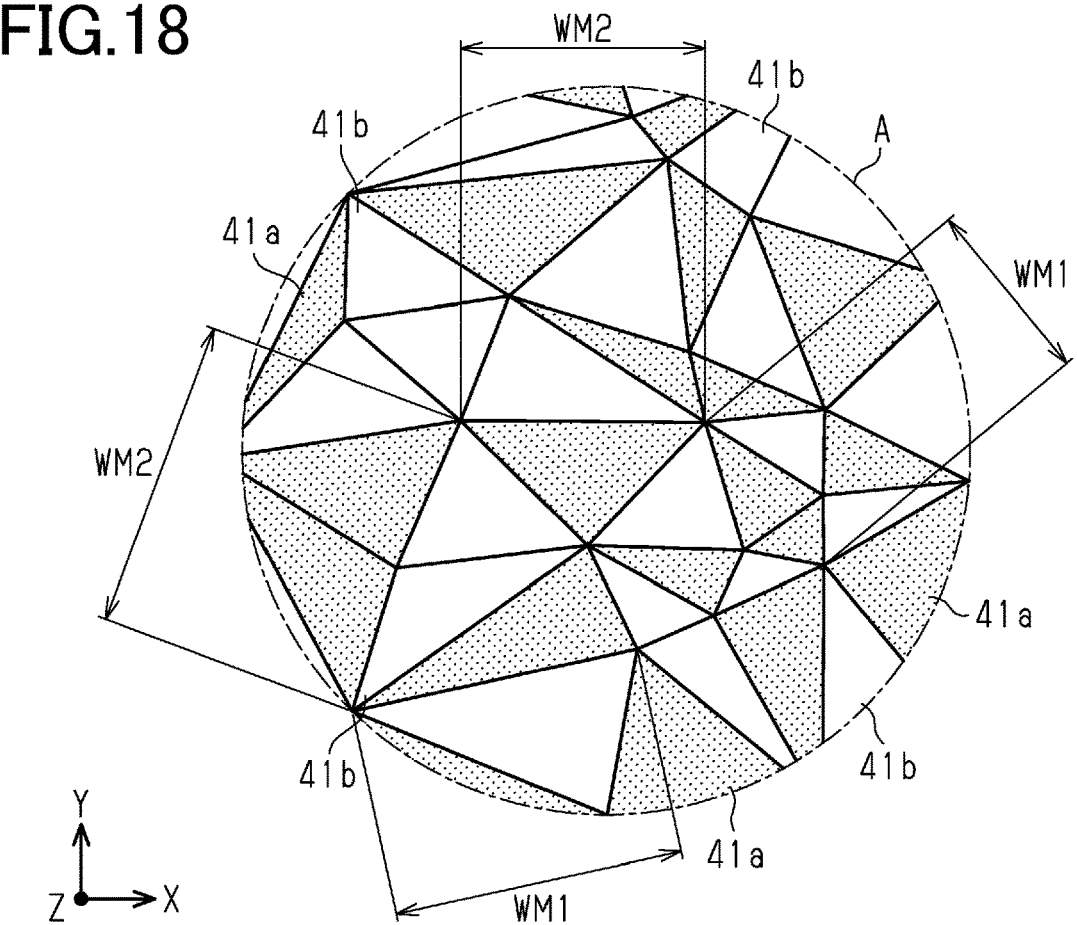
FIG. 18 a schematic partially enlarged plan view illustrating a structure in an overlapped area of a first region.

Referring to FIGS. 17 and 18, a configuration of an optical structure will be described.

FIG. 17 shows an optical structure 40 having a structure surface 40S. The structure surface 40S includes a first region 40A in which a first display region group 41G1 is provided, and a second region 40B in which a second display region group 41G2 is provided. Part of the first region 40A overlaps with part of the second region 40B. The first display region group 41G1 displays a first image and the second display region group 41G2 displays a second image. Display regions of the first image correspond to the first region 40A and display regions of the second image correspond to the second region 40B.

In plan view perpendicular to the structure surface 40S, the first region 40A has a heart-shaped contour and the second region 40B has a circular contour. The first display region group 41G1 has a configuration that is analogous to that of the second display region group 41G2. The first and second images have respective display region groups having configurations analogous to each other, and matching each other. These regions may each have a shape of a complete or an independent portion of a decorative pattern, a mark, a symbol, a logo, a character, a pictorial symbol, an icon, an emblem or a heraldic emblem, instead of a heart-shaped configuration or a circular configuration.

In the first region 40A, a portion not overlapped with the second region 40B is an exclusive area 40A1 and a portion overlapping therewith is an overlap area 40A2. In the second region 40B a portion not overlapped with the first region 40A is an exclusive area 40B1 and a portion overlapping therewith is an overlap area 40B2. Specifically, the overlap area 40A2 of the first region 40A and the overlap area 40B2 of the second region 40B occupy the same area of the structure surface 40S.

Thus, in the structure surface 40S, part of the region in which the first display region group 41G1 is provided overlaps with part of the region in which the second display region group 41G2 is provided. Therefore, one region where the two display region groups overlap each other in the structure surface 40S can display part of the first image displayed by the first display region group 40G1 and part of the second image displayed by the second display region group 41G2.

In the first display region group 11G1 of the first embodiment, the plurality of first display regions 11a belonging thereto have been arranged with no gap therebetween, and also in the second display region group 11G2, the plurality of second display regions 11b belonging thereto have been arranged with no gap therebetween. In contrast, in the present embodiment, at least the overlap area 40A2 of the first region 40A, i.e., the overlap area 40B2 of the second region 40B, includes portions where the first display regions belonging to the first display region group 41G1 are not provided and portions where the second display regions belonging to the second display region group 41G2 are not provided.

FIG. 18 is an enlarged plan view of the site A that is a portion of the overlap area 40A2 of the first region 40A, i.e., a portion of the overlap area 40B2 of the second region 40B. In FIG. 18, the first display regions of the first display region group 41G1 are dotted to easily distinguish them from the second display regions of the second display region group 41G2.

As shown in FIG. 18, in the overlap area 40A2 of the first region 40A, i.e., the overlap area 40B2 of the second region 40B, first display regions 41a of the first display region group 41G1 are mixed with second display regions 41b of the second display region group 41G2. Specifically, in the overlap area 40A2, the total area of the first display regions 41a may be made substantially equal to the total area of the second display regions 41b. Thus, in the overlap area 40A2 of the first region 40A, the total quantity of light reflected from the first display regions 41a may be made substantially equal to the total quantity of light reflected from the second display regions 41b.

As in the optical structure 10 of the first embodiment, the optical structure 40 may, for example, have a first range Φ1 of 0° or more and less than 180° and a second range 12 of 180° or more and less than 360°. Specifically, as described above, the difference between the maximum value in the first range Φ1 and the minimum value in the second range 12 may be set to 90° or more, and the difference between the maximum value in the second range 12 and the minimum value in the first range Φ1 may be set to 90° or more. In this case, the individual images can be easily distinguished from each other.

As in the first embodiment described above, the reflective surfaces of the first display regions 41a correspond to the first reflective surfaces, while the reflective surfaces of the second display regions 41b correspond to the second reflective surfaces. In the structure surface 40S, the maximum dimension of a region where only the first reflective surfaces are provided is a first maximum dimension WM1 and the maximum dimension of a region where only the second reflective surfaces are provided is a second maximum dimension WM2. The first and second maximum dimensions WM1 and WM2 are each 300 μm or less. In other words, the first and second display regions 41a and 41b are provided on the structure surface 40S such that the first and second maximum dimensions WM1 and WM2 are both 300 μm or less.

For example, if all the sides defining a first display region 41a are shared with second display regions 41b, the largest one of the sides defining the first display region 41a is the first maximum dimension WM1. If at least one of the sides defining a first display region 41a is shared with another first display region 41a, the region occupied by these first display regions 41a sharing a side is a region where only the first reflective surfaces are provided. The maximum dimension of the region configured by these first display regions 41a is the first maximum dimension WM1.

Furthermore, if all the sides defining a second display region 41b are shared with first display regions 41a, the largest one of the sides defining the second display region 41b is the second maximum dimension WM2. If at least one of the sides defining a second display region 41b is shared with another second display region 41b, the region occupied by these second display regions 41b sharing a side is a region where only the second reflective surfaces are provided. The maximum dimension of the region configured by these second display regions 41b is the second maximum dimension WM2.

Since the distances between the first and second reflective surfaces are 300 μm or less, which is not more than the resolution of the human eye, the observer is unlikely to distinguish the region where the first display region group 41G1 is provided from the region where the second display region group 41G2 is provided on the structure surface 40S. Therefore, while the observer is visually recognizing the image produced by the first display region group 41G1, or while the observer is visually recognizing the image produced by the second display region group 41G2, the other display region group not producing an image is unlikely to be visually recognized as a surface having poor-quality appearance. Consequently, the optical structure 40 will have a high-quality appearance. In this way, the optical structure 40 is imparted with high quality as a motif. Moreover, the optical structure 40 is impressive to the observer.

In other words, first display regions 41a sandwiching at least one second display region 41b therebetween have a distance of 300 μm or less therebetween. Accordingly, the distance between the first image segments respectively produced by these first display regions 41a is substantially 300 μm or less. Thus, since the gaps between the first image segments are unlikely to be visually recognized by the observer, the regions where the first image segments are not provided are unlikely to be visually recognized by the observer in the first image produced by the plurality of first image segments.

Similarly, second display regions 41b sandwiching at least one first display region 41a therebetween have a distance of 300 μm or less therebetween. Accordingly, the distance between the second image segments respectively produced by these second display regions 41b is substantially 300 μm or less. Thus, since the gaps between the second image segments are unlikely to be visually recognized by the observer, the regions where the second image segments are not provided are unlikely to be visually recognized by the observer in the second image produced by the plurality of second image segments.

In each exclusive area 40A1 of the first region 40A, a plurality of first display regions 41a are provided and no second display regions 41b are provided. Similarly, in each exclusive area 40B1 of the second region 40B, a plurality of second display regions 41b are provided and no first display regions 41a are provided.

In each exclusive area 40A1 of the first region 40A, a plurality of first display regions 41a may be arranged with no gap therebetween. In each exclusive area 40B1 of the second region 40B, a plurality of second display regions 41b may be arranged with no gap therebetween.

However, to achieve similar brightness between the exclusive areas 40A1 and the overlap area 40A2 in the first region 40A, the ratio of the first display regions 41a in the exclusive areas 40A1 may be made equal to the ratio of the first display regions 41a in the overlap area 40A2. Also, to achieve similar light intensity between the exclusive areas 40B1 and the overlap area 40B2 in the second region 40B, the ratio of the second display regions 41b in the exclusive areas 40B1 may be made equal to the ratio of the second display regions 41b in the overlap area 40B2.

[Appearance of the Optical Structure]

Figure 19:
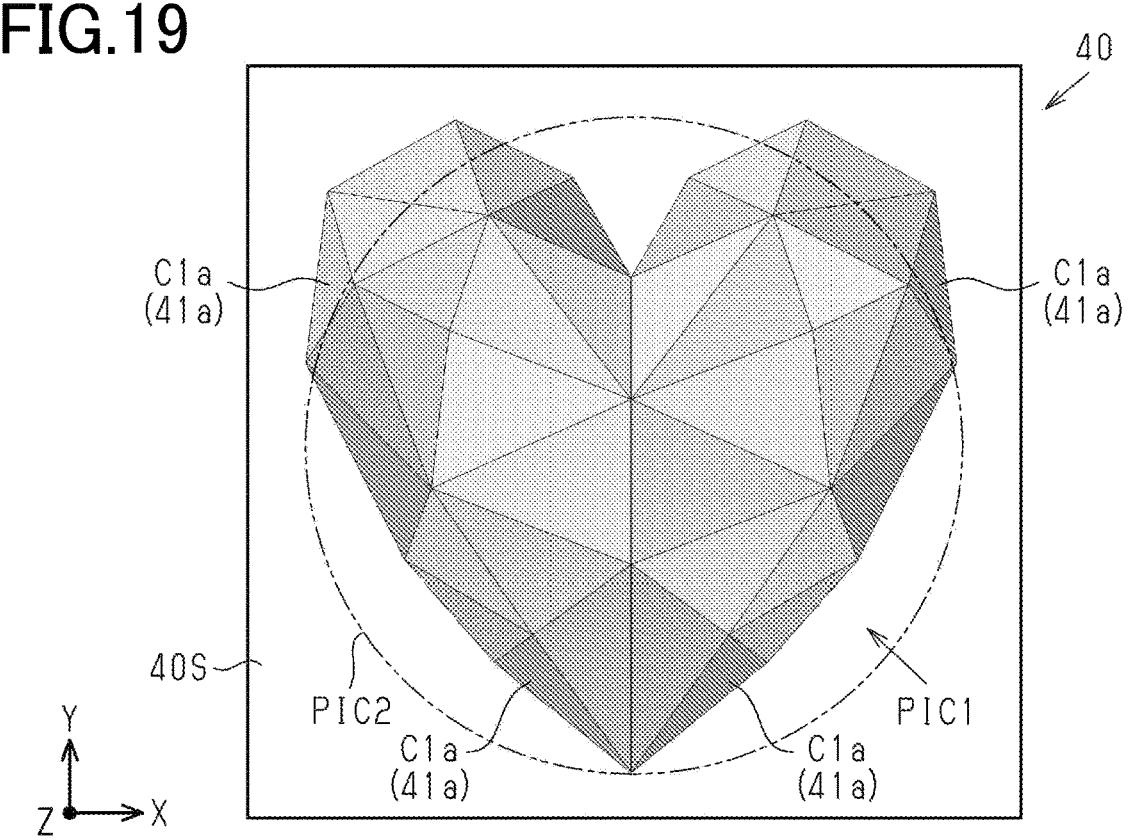
FIG. 19 is a plan view illustrating light and dark in a first image displayed by an optical structure.
Figure 20:
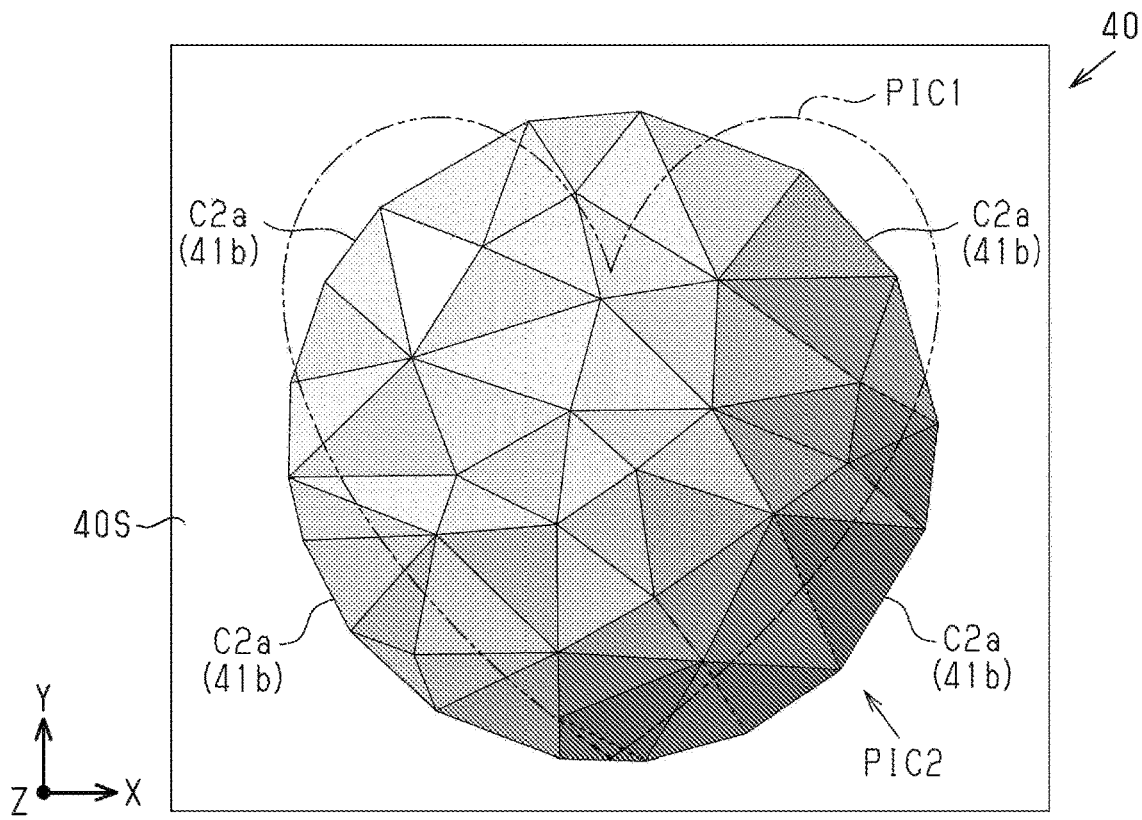
FIG. 20 is a plan view illustrating light and dark in a second image displayed by an optical structure.

Referring to FIGS. 19 and 20, an appearance of the optical structure 40 will be described. As described referring to FIG. 8, FIG. 19 shows a first image PIC1 which is visually recognized when the optical structure 40 in the reference state is tilted rightward. As described referring to FIG. 13, FIG. 20 shows a second image PIC2 which is visually recognized when the optical structure 40 in the reference state is tilted leftward.

For the sake of convenience, in FIGS. 19 and 20, the size of each first image segment C1a and the size of each second image segment C2a are exaggerated. For convenience of illustration, in FIGS. 19 and 20, the shapes of the first image segments are not consistent with those of the first display regions 41a shown in FIG. 18, and the shapes of the second image segments are not consistent with those of the second display regions 41b shown in FIG. 18.

As shown in FIG. 19, when the optical structure 40 in the reference state is tilted rightward, the first image PIC1 produced by the assembly of the plurality of first image segments C1a is visually recognized by the observer of the optical structure 40. In this case, each first image segment C1a will have brightness conforming to the inclination angle θ and the azimuth angle 1 of the reflective surfaces of the first display region 41a forming the first image segment C1a. Thus, the first image PIC1 is visually recognized by the observer as a three-dimensional image.

As shown in FIG. 20, when the optical structure 40 in the reference state is tilted leftward, the second image PIC2 produced by the assembly of the plurality of second image segments C2a is visually recognized by the observer of the optical structure 40. In this case, each second image segment C2a will have brightness conforming to the inclination angle θ and the azimuth angle Φ of the reflective surfaces of the second display region 41b forming the second image segment C1a. Thus, the second image PIC2 is visually recognized by the observer as a three-dimensional image.

As described above, according to the second embodiment of the optical structure, advantageous effects as set forth below can be obtained.

(8) Since the distances between the first and second reflective surfaces are 300 μm or less which is not more than the resolution of the human eye, the observer is unlikely to distinguish the region where the first display region group 41G1 is provided from the region where the second display region group 41G2 is provided on the structure surface 40S. Therefore, while the observer is visually recognizing the first image PIC1 produced by the first display region group 41G1, or while the observer is visually recognizing the second image PIC2 produced by the second display region group 41G2, the other display region group not producing an image is unlikely to be visually recognized as a surface having a poor-quality appearance. Consequently, the optical structure 40 will have a high-quality appearance. In this way, the optical structure 40 is imparted with high quality as a motif. Moreover, the optical structure 40 is impressive to the observer.

The second embodiment described above may be appropriately modified and implemented as follows.

In the overlap area 40A2 of the first region 40A, i.e., in the overlap area 40B2 of the second region 40B, the first maximum dimensions WM1 and the second maximum dimensions WM2 may include values larger than 300 μm. With this configuration, the gaps between the image segments may be visually recognized in the first and second images PIC1 and PIC2; however, the first image PIC1 may still be switched to the second image PIC2, or vice versa, by tilting the optical structure 40.

The first and second embodiments described above may be appropriately modified and implemented as follows.

The optical structure 10 or 40 may be applied to paper or film media having printing thereon to obtain high quality printing (Fine Press).

This high quality printing may be security printing. Security printing may be printing of authentication documents, valuable securities, banknotes, and the like. High quality printing can minimize forgery of security printing. By adhering the optical structure 10 or 40 to paper or film media having printing thereon, high quality printing can be obtained. By embedding the optical structure 10 or 40 in paper or film media having printing thereon as well, high quality printing can be obtained. Furthermore, after adhering or embedding the optical structure 10 or 40, further printing may be provided thereon. The printing may be offset printing, gravure printing or screen printing. Printing can be conducted using an ink as a material. The ink may be a pigment ink or a dye ink. Alternatively, the ink may be a visible ink or an invisible ink. The invisible ink may be a fluorescent ink or an infrared absorbing ink.

What is claimed is:

1. An optical structure, comprising:
a structure surface that includes a plurality of display region groups including a first display region group and a second display region group, each of the display region groups having a plurality of polygonal display regions, wherein:
each polygonal display region of each display region group of the plurality of display region groups includes a plurality of reflective surfaces that reflect light incident on the structure surface toward a display direction of an image that is unique to the display region group, the reflective surfaces being arranged at an average pitch of 1 μm or more and 300 μm or less in a direction in which the reflective surfaces are arranged;
in each polygonal display region of each display region group of the plurality of display region groups, a projection direction is defined, the projection direction being a direction in which a normal direction to the reflective surfaces is projected onto the structure surface and having an azimuth angle relative to a reference direction in the structure surface, and the plurality of reflective surfaces belonging to the polygonal display region produce an image;
in each display region group of the plurality of display region groups, the plurality of polygonal display regions include a set of display regions whose azimuth angles are different from each other, and the plurality of display regions produce an image, which is unique to the display region group, in the display direction by the plurality of reflective surfaces belonging to each of the display regions;
the display direction of the first display region group is different from the display direction of the second display group to provide brightness that is different between the image unique to the first display region group and the image unique to the second display region group, in the respective display directions of the images;
the first display region group and the second display region group match each other to produce a motif;
wherein each display region group of the plurality of display region groups comprises at least two polygonal display regions which differ from each other in at least one of a shape or a size; and
wherein each polygonal display region of each display region group of the plurality of display region groups comprises a plurality of scaling mirrors arranged at an average pitch of 1 micron to 300 microns, each scaling mirror of the plurality of scaling mirrors has a reflecting surface, such that for each particular polygonal display region a reflecting surface for each scaling mirror of the plurality of scaling mirrors has the same normal direction and each scaling mirror of the plurality of scaling mirrors has the same height.

2. The optical structure of claim 1, wherein:
the polygonal display regions belonging to the first display region group are first display regions, and the reflective surfaces provided to each of the first display regions are first reflective surfaces;
the azimuth angle of the first reflective surfaces is in a first range;
the polygonal display regions belonging to the second display region group are second display regions, and the reflective surfaces provided to each of the second display regions are second reflective surfaces; and
the azimuth angle of the second reflective surfaces is in a second range that is different from the first range.

3. The optical structure of claim 2, wherein:
the azimuth angle has a value that is 0° or more and less than 360°;
the first range is a predetermined range that is 0° or more and less than 180°; and
the second range is a predetermined range that is 180° or more and less than 360°.

4. The optical structure of claim 2, wherein:
the azimuth angle has a value that is 0° or more and less than 360';
the first range is a predetermined range that is 90° or more and less than 270°; and
the second range is a predetermined range that is in a range configured by a range of 0° or more and less than 90° and a range of 270° or more and less than 360°.

5. The optical structure of claim 2, wherein, in the structure surface, at least a part of the region where the first display region group is provided overlaps with at least a part of the region where the second display region group is provided.

6. The optical structure of claim 5, wherein, in plan view perpendicular to the structure surface, a region where only the first reflective surfaces are provided has a maximum dimension that is 300 μm or less, and a region where only the second reflective surfaces are provided has a maximum dimension that is 300 μm or less.

7. The optical structure of claim 1, wherein:
a maximum distance between the reflective surfaces and the structure surface is a height of the reflective surfaces; and
the height is constant in each display region of each display region group of the plurality of display region groups.

8. The optical structure of claim 1, wherein:
a maximum distance between the reflective surfaces and the structure surface is a height of the reflective surfaces; and
in each display region group of each display region group of the plurality of display region groups, a ratio of a minimum value of the height to a maximum value of the height is 50% or more.

9. The optical structure of claim 1, comprising:
multilayer interference layers each configured by a plurality of dielectric layers, wherein
each of the multilayer interference layers is configured to reflect light having a predetermined wavelength by allowing the plurality of dielectric layers contacting each other to have refractive indices different from each other in a direction in which the dielectric layers are laminated; and
the reflective surfaces are surfaces of the multilayer interference layers.

10. The optical structure of claim 1, wherein each polygonal display region of each display region group of the plurality of display region groups is a triangular display region.

11. The optical structure of claim 1, wherein in each display region group of the plurality of display region groups, the plurality of polygonal display regions comprises a first polygonal display region and a second polygonal display region, such that a normal direction of the plurality of reflecting surfaces in the first polygonal display region is different from a normal direction for the plurality of reflecting surfaces in the second polygonal display region.

12. The optical structure of claim 1, wherein in each display region group of the plurality of display region groups, each polygonal display region has a normal direction of the plurality of reflective surface in the region, which is different from a normal direction of reflecting surfaces in any polygonal display region, with which the respective polygonal display region shares sides.

* * * * *